United States Patent
Xue et al.

(10) Patent No.: US 12,335,931 B2
(45) Date of Patent: Jun. 17, 2025

(54) COMMUNICATION METHOD AND APPARATUS

(71) Applicant: Huawei Technologies Co., Ltd., Shenzhen (CN)

(72) Inventors: Yifan Xue, Beijing (CN); Xiaolei Tie, Shanghai (CN); Zhanzhan Zhang, Shanghai (CN); Han Zhou, Shanghai (CN); Wenwen Huang, Shanghai (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 397 days.

(21) Appl. No.: 17/738,753

(22) Filed: May 6, 2022

(65) Prior Publication Data
US 2022/0264574 A1 Aug. 18, 2022

Related U.S. Application Data

(63) Continuation of application No. PCT/CN2020/123968, filed on Oct. 27, 2020.

(30) Foreign Application Priority Data

Nov. 8, 2019 (CN) .......................... 201911089858.9

(51) Int. Cl.
*H04W 72/0453* (2023.01)
*H04W 72/23* (2023.01)
*H04W 76/28* (2018.01)

(52) U.S. Cl.
CPC ....... *H04W 72/0453* (2013.01); *H04W 72/23* (2023.01); *H04W 76/28* (2018.02)

(58) Field of Classification Search
CPC ................. H04W 72/23; H04W 76/28; H04W 72/0453
See application file for complete search history.

(56) References Cited

U.S. PATENT DOCUMENTS

| | | |
|---|---|---|
| 2009/0221283 A1 | 9/2009 | Soliman |
| 2019/0103954 A1 | 4/2019 | Lee et al. |

(Continued)

FOREIGN PATENT DOCUMENTS

| | | |
|---|---|---|
| CN | 110167128 A | 8/2019 |
| WO | 2019182287 A1 | 9/2019 |

OTHER PUBLICATIONS

Huawei, HiSilicon, "Discussion on low latency SCell activation and efficient SCell management," 3GPP TSG RAN WG1 #99 Reno, USA, Nov. 18-22, 2019, R1-1911875, 13 pages.

(Continued)

*Primary Examiner* — Ajay Cattungal
(74) *Attorney, Agent, or Firm* — Conley Rose, P.C.

(57) ABSTRACT

A communication method includes that, when a terminal device receives indication information used by a network device to indicate the terminal device to work on a non-dormant bandwidth part (BWP) in a secondary cell, the terminal device can determine a specific BWP on which the terminal device is to work, and perform a corresponding operation. A network device generates indication information, and sends the indication information to a terminal device, where the indication information is used to indicate the terminal device to work on a non-dormant BWP in a first secondary cell. Then, the terminal device enables, according to the indication information, the terminal device to work on a first BWP, where the first BWP is the non-dormant BWP in the first secondary cell.

20 Claims, 7 Drawing Sheets

(56) References Cited

U.S. PATENT DOCUMENTS

| | | | |
|---|---|---|---|
| 2019/0132109 A1 | 5/2019 | Zhou et al. | |
| 2019/0132110 A1 | 5/2019 | Zhou et al. | |
| 2019/0149213 A1 | 5/2019 | Zhou et al. | |
| 2019/0207667 A1 | 7/2019 | Zhou et al. | |
| 2019/0215136 A1 | 7/2019 | Zhou et al. | |
| 2019/0215896 A1 | 7/2019 | Zhou et al. | |
| 2020/0236692 A1* | 7/2020 | Lin | H04W 72/535 |
| 2021/0337554 A1* | 10/2021 | Wang | H04W 24/10 |
| 2021/0392651 A1* | 12/2021 | Futaki | H04L 5/0098 |
| 2022/0182939 A1* | 6/2022 | Xu | H04L 5/0053 |
| 2022/0210863 A1* | 6/2022 | Wang | H04W 76/28 |
| 2022/0400434 A1* | 12/2022 | Seo | H04B 7/061 |

OTHER PUBLICATIONS

R1-1908180, vivo, "Efficient Scell activation," 3GPP TSG RAN WG1 #98, Prague, CZ, Aug. 26-30, 2019, 4 pages.

R2-1912285, OPPO, "Introduction of dormancy behavior in NR," 3GPP TSG-RAN WG2 Meeting #107bis, ChongQing, China, Oct. 14-18, 2019, 4 pages.

R2-1913491, ZTE Corporation et al., "On SCG Suspension," 3GPP TSG-RAN WG2 Meeting #107bis, 3GPP TSG-RAN WG2 Meeting #107bis, 8 pages.

Rp-190972, Ericsson, "DC and CA enhancements," 3GPP TSG RAN meeting #84, Newport Beach, USA, Jun. 3-6, 2019, 13 pages.

3GPP TS 38.212 V15.7.0, Sep. 2019, "3rd Generation Partnership Project; Technical Specification Group Radio Access Network; NR; Multiplexing and channel coding (Release 15)," 101 pages.

3GPP TS 38.213 V15.7.0, Sep. 2019, "3rd Generation Partnership Project; Technical Specification Group Radio Access Network; NR; Physical layer procedures for control (Release 15)," 108 pages.

3GPP TS 38.300 V15.7.0, Sep. 2019, "3rd Generation Partnership Project; Technical Specification Group Radio Access Network; NR; NR and NG-RAN Overall Description; Stage 2 (Release 15)," 99 pages.

3GPP TS 38.321 V15.7.0, Sep. 2019, "3rd Generation Partnership Project; Technical Specification Group Radio Access Network; NR; Medium Access Control (MAC) protocol specification (Release 15)," 78 pages.

3GPP TS 38.331 V15.7.0, Sep. 2019, "3rd Generation Partnership Project; Technical Specification Group Radio Access Network; NR; Radio Resource Control (RRC) protocol specification (Release 15)," 527 pages.

R1-1907333, Ericsson et al, "Reduced latency Scell management for NR-NR CA," 3GPP TSG-RAN WG1 #97, Reno, USA, May 13-17, 2019, 5 pages.

R1-1910604, Nokia et al., "Efficient CA design," 3GPP TSG RAN WG1 Meeting RAN1#98bis, Chongqing, China, Oct. 14-20, 2019, 7 pages.

R1-1911015, Ericsson, "Reduced latency Scell management for NR CA," 3GPP TSG-RAN WG1 #98bis, Chongqing, China, Oct. 14-20, 2019, 9 pages.

R1-1911139, Qualcomm Incorporated, "Fast SCell Activation and SCell Dormancy," 3GPP TSG-RAN WG1 #98bis, Chongqing, China, Oct. 14-20, 2019, 18 pages.

R2-1805748, Qualcomm et al., "Dormant BWP for fast SCell activation," 3GPP TSG-RAN WG2 Meeting #101bis Sanya, China, Apr. 16-20, 2018, 2 pages.

Ericsson, "Reduced latency Scell management for NR CA," 3GPP TSG RAN WG1 #98, Prague, Czech Republic, Aug. 26-30, 2019, R1-1909144, 7 pages.

3GPP TSG-RAN WG1 #97, R1-1907306, "Fast SCG and SCell Activation", Qualcomm Incorporated, Reno, USA, May 13-17, 2019, XP051728746, total 11 pages.

3GPP TSG RAN WG1 #98bis, R1-1910233, "Remaining aspects of PDCCH-based power saving signal", vivo, Chongqing, China, Oct. 14-20, 2019, XP051808136, total 14 pages.

3GPP TSG RAN WG1 Meeting #98bis, R1-1910039, "Discussion on low latency SCell activation and efficient SCell management", Huawei, HiSilicon, Chongqing, China, Oct. 14-20, 2019, XP051808399, total 19 pages.

3GPP TSG RAN WG1 Meeting #98bis, R1-1910325, "Triggering of SCell dormancy", CATT, Chongqing, China, Oct. 14-20, 2019, XP051808506, total 5 pages.

* cited by examiner

COMMUNICATION METHOD AND APPARATUS

CROSS-REFERENCE TO RELATED APPLICATIONS

This is a continuation of International Patent Application No. PCT/CN2020/123968 filed on Oct. 27, 2020, which claims priority to Chinese Patent Application No. 201911089858.9 filed on Nov. 8, 2019. The disclosures of the aforementioned applications are hereby incorporated by reference in their entireties.

TECHNICAL FIELD

This disclosure relates to the field of communications technologies, and in particular, to a communication method and an apparatus.

BACKGROUND

With development of communications technologies, carrier aggregation (CA) is introduced into a standard. A plurality of component carriers (CC) may be configured for one terminal device. One of the CCs corresponds to a primary cell (PCell), which is a cell in which the terminal device establishes an initial connection, a cell in which the terminal device reestablishes a radio resource control (RRC) connection, or a primary cell specified in a handover process. The PCell is responsible for RRC communication with the terminal device. Physical uplink control channel (PUCCH) information can be sent only in the PCell. The other CCs correspond to secondary cells (SCells).

When CA is configured for the terminal device, a network device may indicate, in the PCell, the terminal device whether to perform dormancy behavior in an SCell. If the network device indicates the terminal device to perform dormancy behavior, the terminal device does not monitor physical downlink control channel (PDCCH) information in the corresponding SCell.

5th generation (5G) new radio (NR) supports a bandwidth part (BWP) technology, that is, supports transmission between a network device and a terminal device by occupying a part of bandwidth. On one carrier (cell), the network device may configure a plurality of BWPs for the terminal device, so that the terminal device can support a plurality of service types. Based on this, a specific method in which the network device indicates the terminal device to perform dormancy behavior may be: configuring a dormant BWP (dormant BWP) in the SCell, and then indicating, in the PCell by using 1 bit, the terminal device to switch between the dormant BWP and a non-dormant BWP in the SCell. For example, '1' indicates switching from the dormant BWP to the non-dormant BWP, and '0' indicates switching from the non-dormant BWP to the dormant BWP.

However, a current standard discusses only that the network device indicates the dormancy behavior of the terminal device by using indication information, but specific behavior performed by the terminal device after the terminal device receives the indication information is not clear.

SUMMARY

This disclosure provides a communication method and an apparatus, so that when a terminal device receives indication information used by a network device to indicate the terminal device to work on a non-dormant BWP in a secondary cell, the terminal device can determine a specific BWP on which the terminal device is to work, and perform a corresponding operation.

According to a first aspect, this disclosure provides a communication method. The method includes: A terminal device receives indication information from a network device, where the indication information is used to indicate the terminal device to work on a non-dormant bandwidth part BWP in a first secondary cell; and the terminal device enables, according to the indication information, the terminal device to work on a first BWP, where the first BWP is the non-dormant BWP in the first secondary cell.

According to the foregoing method, when receiving indication information used by the network device to indicate the terminal device to work on a non-dormant BWP in a secondary cell, the terminal device can determine a specific BWP on which the terminal device is to work, and work on the corresponding BWP.

In a possible design, a specific method in which the terminal device enables the terminal device to work on the first BWP may be: The terminal device switches from a second BWP to the first BWP, where the second BWP is a dormant BWP or a non-dormant BWP currently used by the terminal device, and the first BWP is a first active BWP in the first secondary cell. In this way, the terminal device can work on the determined BWP.

In a possible design, a specific method in which the terminal device enables the terminal device to work on the first BWP may be: The terminal device switches from a third BWP to the first BWP, where the third BWP is a dormant BWP or a non-dormant BWP currently used by the terminal device, and the first BWP is a BWP that is configured by the network device and to which the terminal device needs to switch. In this way, the terminal device can work on the determined BWP.

In a possible design, a specific method in which the terminal device enables the terminal device to work on the first BWP may be: The terminal device switches from a fourth BWP to the first BWP, where the fourth BWP is a dormant BWP in the first secondary cell, and the terminal device works on the first BWP before switching to the fourth BWP. In this way, the terminal device can work on the determined BWP.

In a possible design, a specific method in which the terminal device enables the terminal device to work on the first BWP may be: The terminal device switches from a fifth BWP to the first BWP, where the fifth BWP is a dormant BWP in the first secondary cell, and the first BWP is associated with the fifth BWP. In this way, the terminal device can work on the determined BWP.

In a possible design, a specific method in which the terminal device enables the terminal device to work on the first BWP may be: When the terminal device currently uses the first BWP, the terminal device keeps the terminal device working on the first BWP. In this way, the terminal device can work on the determined BWP.

According to a second aspect, this disclosure provides a communication method. The method may include: A network device generates indication information, where the indication information is used to indicate a terminal device to work on a non-dormant bandwidth part BWP in a first secondary cell; and the network device sends the indication information to the terminal device, to enable the terminal device to work on a first BWP, where the first BWP is the non-dormant BWP in the first secondary cell.

According to the foregoing method, when receiving indication information used by the network device to indicate the terminal device to work on a non-dormant BWP in a secondary cell, the terminal device can determine a specific BWP on which the terminal device is to work, and work on the corresponding BWP.

According to a third aspect, this disclosure provides a communication method. The method may include: A terminal device receives first configuration information from a network device, where the first configuration information is used to configure or indicate the terminal device to receive downlink control information, a category of indication information included in the downlink control information includes at least one of first indication information or second indication information or a category of indication information included in the downlink control information includes neither first indication information nor second indication information, the first indication information is used to indicate the terminal device whether to start an on duration timer in a first discontinuous reception (DRX) cycle, and the second indication information is used to indicate the terminal device whether to perform a dormancy operation in a secondary cell; and the terminal device monitors or does not monitor first downlink control information based on the first configuration information and the category of the indication information included in the downlink control information. In this way, specific behavior about whether the terminal device monitors the downlink control information is determined.

In a possible design, when the category of the indication information included in the downlink control information includes the first indication information, the terminal device receives second configuration information from the network device, and the second configuration information is used to configure that the category of the indication information included in the downlink control information includes the first indication information. Alternatively, the category of the indication information included in the downlink control information includes the first indication information by default.

In a possible design, the terminal device monitors the first downlink control information; and when the first indication information is used to indicate the terminal device to start the on duration timer in the first DRX cycle, the terminal device starts the on duration timer in the first DRX cycle, and monitors a PDCCH in each cell within on duration in the first DRX cycle; or when the first indication information is used to indicate the terminal device not to start the on duration timer in the first DRX cycle, the terminal device does not start the on duration timer in the first DRX cycle, and does not monitor a PDCCH in each cell within on duration in the first DRX cycle. In this way, specific behavior about whether the terminal device monitors the downlink control information is determined.

In a possible design, when the category of the indication information included in the downlink control information includes the first indication information and the second indication information, the terminal device monitors the first downlink control information; and when the first indication information is used to indicate the terminal device to start the on duration timer in the first DRX cycle, the terminal device starts the on duration timer in the first DRX cycle, monitors a physical downlink control channel PDCCH in a primary cell within on duration in the first DRX cycle, and determines, based on the second indication information, whether to monitor a PDCCH in the secondary cell within the on duration in the first DRX cycle; or when the first indication information is used to indicate the terminal device not to start the on duration timer in the first DRX cycle, the terminal device does not start the on duration timer in the first DRX cycle, and does not monitor a PDCCH in each cell within on duration in the first DRX cycle. In this way, specific behavior about whether the terminal device monitors the downlink control information when the category of the indication information included in the downlink control information includes the first indication information and the second indication information is determined.

In a possible design, when the category of the indication information included in the downlink control information includes the second indication information, the terminal device monitors the first downlink control information; the terminal device starts the on duration timer in the first DRX cycle, and monitors a PDCCH in a primary cell within on duration in the first DRX cycle; and the terminal device determines, based on the second indication information, whether to monitor a PDCCH in the secondary cell within the on duration in the first DRX cycle. In this way, specific behavior about whether the terminal device monitors the downlink control information when the category of the indication information included in the downlink control information includes the second indication information is determined.

In a possible design, when the category of the indication information included in the downlink control information includes neither the first indication information nor the second indication information, the terminal device does not monitor the first downlink control information. In this way, specific behavior about whether the terminal device monitors the downlink control information when the category of the indication information included in the downlink control information includes neither the first indication information nor the second indication information is determined.

According to a fourth aspect, this disclosure provides a communication method. The method may include: A network device sends first configuration information to the terminal device, where the first configuration information is used to configure or indicate the terminal device to receive downlink control information, a category of indication information included in the downlink control information includes at least one of first indication information or second indication information or a category of indication information included in the downlink control information includes neither first indication information nor second indication information, the first indication information is used to indicate the terminal device whether to start an on duration on duration timer in a first discontinuous reception DRX cycle, and the second indication information is used to indicate the terminal device whether to perform a dormancy operation in a secondary cell; and the network device sends or does not send first downlink control information based on the first configuration information and the category of the indication information included in the downlink control information. In this way, the terminal device can determine specific behavior about whether to monitor the downlink control information.

According to a fifth aspect, this disclosure further provides a terminal device. The terminal device has a function of implementing the terminal device in the method example in the first aspect or the third aspect. The function may be implemented by hardware, or may be implemented by hardware by executing corresponding software. The hardware or the software includes one or more modules corresponding to the function.

In a possible design, a structure of the terminal device includes a processing unit and a transceiver unit. These units may perform corresponding functions in the method example in the first aspect or the third aspect. For details, refer to the detailed descriptions in the method example. Details are not described herein.

In a possible design, a structure of the terminal device includes a transceiver and a processor, and optionally may further include a memory. The transceiver is configured to send and receive data, and communicate and interact with another device in a system. The processor is configured to support the terminal device in performing a corresponding function of the terminal device in the method in the first aspect or the third aspect. The memory is coupled to the processor, and the memory stores program instructions and data that are necessary for the terminal device.

According to a sixth aspect, this disclosure further provides a network device. The network device has a function of implementing the network device in the method example in the second aspect or the fourth aspect. The function may be implemented by hardware, or may be implemented by hardware by executing corresponding software. The hardware or the software includes one or more modules corresponding to the function.

In a possible design, a structure of the network device includes a processing unit and a transceiver unit. These units may perform corresponding functions in the method example in the second aspect or the fourth aspect. For details, refer to the detailed descriptions in the method example. Details are not described herein.

In a possible design, a structure of the network device includes a transceiver and a processor, and optionally may further include a memory. The transceiver is configured to send and receive data, and communicate and interact with another device in a system. The processor is configured to support the network device in performing a corresponding function of the network device in the method in the second aspect or the fourth aspect. The memory is coupled to the processor, and the memory stores program instructions and data that are necessary for the network device.

According to a seventh aspect, this disclosure further provides a communications system. The communications system includes the terminal device and the network device mentioned in at least one of the foregoing designs. Further, the network device in the communications system may perform any method performed by the network device in the foregoing methods, and the terminal device in the communications system may perform any method performed by the terminal device in the foregoing methods.

According to an eighth aspect, this disclosure provides a computer-readable storage medium. The computer-readable storage medium stores computer executable instructions, and when being invoked by a computer, the computer executable instructions are used to enable the computer to perform any one of the foregoing methods.

According to a ninth aspect, this disclosure provides a computer program product including instructions. When the computer program product runs on a computer, the computer is enabled to perform any one of the foregoing methods.

According to a tenth aspect, this disclosure provides a chip. The chip is coupled to a memory, and is configured to read and execute program instructions stored in the memory, to implement any one of the foregoing methods.

DESCRIPTION OF EMBODIMENTS

The following further describes this disclosure in detail with reference to the accompanying drawings.

Embodiments of this disclosure provide a communication method and an apparatus, so that when a terminal device receives indication information used by a network device to indicate the terminal device to work on a non-dormant BWP in a secondary cell, the terminal device can determine a specific BWP on which the terminal device is to work, and perform a corresponding operation. The method and the apparatus in this disclosure are based on a same concept. The method and the apparatus have similar problem resolving principles. Therefore, for implementation of the apparatus and the method, mutual reference may be made to each other. Details of repeated parts are not described.

In the descriptions of this disclosure, terms such as "first" and "second" are merely used for distinction and description, and should not be understood as an indication or implication of relative importance, or as an indication or implication of an order.

In the descriptions of this disclosure, "at least one" refers to one or more, and "a plurality of" refers to two or more.

To describe technical solutions in the embodiments of this disclosure more clearly, the following describes the communication method and the apparatus according to the embodiments of this disclosure in detail with reference to the accompanying drawings.

Figure 1:
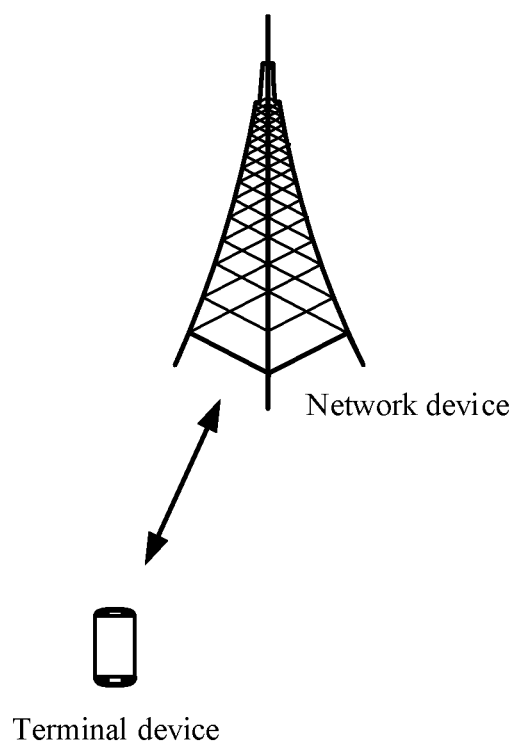
FIG. 1 is an architectural diagram of a communications system according to this disclosure.

FIG. 1 shows an architecture of a possible communications system to which a communication method according to an embodiment of this disclosure is applicable. The architecture of the communications system includes a network device and a terminal device.

The network device is a device that has a wireless transceiver function or a chip that can be disposed in the network device. The network device includes but is not limited to: a gNB, a radio network controller (RNC), a NodeB (NB), a base station controller (BSC), a base transceiver station (BTS), a home base station (for example, a home evolved NodeB, a home NodeB, or HNB), a baseband unit (BBU), an access point (AP) in a WIFI system, a wireless relay node, a wireless backhaul node, or a transmission and reception point (TRP or transmission point (TP)). The network device may alternatively be a network node, such as a BBU or a distributed unit (DU), that constitutes a gNB or a transmission point.

In some deployments, the gNB may include a centralized unit (CU) and a DU. The gNB may further include a radio frequency unit (radio unit (RU)). The CU implements some functions of the gNB, and the DU implements some functions of the gNB. For example, the CU implements functions of an RRC layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in such an architecture, higher layer signaling, such as RRC layer signaling or PDCP layer signaling, may be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited.

The terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this disclosure may be a mobile phone, a tablet computer (Pad), a computer having a wireless transceiver function, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in the embodiments of this disclosure. In this disclosure, a terminal device having a wireless transceiver function and a chip that can be disposed in the terminal device are collectively referred to as terminal devices.

It should be noted that the communications system shown in FIG. 1 may be but is not limited to a 5G system, for example, an NR. Optionally, the method in the embodiments of this disclosure is further applicable to various future communications systems, for example, a 6G system or another communications network.

Currently, CA is introduced into a standard. A plurality of CCs may be configured for one terminal device. One of the CCs corresponds to a PCell, which is a cell in which the terminal device establishes an initial connection, a cell in which the terminal device reestablishes an RRC connection, or a primary cell specified in a handover process. The PCell is responsible for RRC communication with the terminal device. PUCCH information can be sent in only the PCell. The other CCs correspond to SCells.

When CA is configured for the terminal device, a network device may indicate, in the PCell, the terminal device whether to perform dormancy behavior in an SCell. If the terminal device is indicated to perform dormancy behavior, the terminal device does not monitor a PDCCH in the corresponding SCell. A specific method is as follows: A dormant BWP is configured in the SCell. Then, in the PCell, the terminal device is indicated, by using 1-bit, to switch between the dormant BWP and a non-dormant BWP in the SCell. For example, '1' indicates that the terminal device performs dormancy behavior in the SCell, for example, switches from the dormant BWP to the non-dormant BWP, and '0' indicates that the terminal device performs non-dormancy behavior in the SCell, for example, switches from the non-dormant BWP to the dormant BWP. Certainly, there may also be another case for the 1-bit. This is not limited in this disclosure.

Specifically, the 1-bit indication in the PCell has the following two possibilities:

A first possibility is as follows: When connected mode (C)-DRX is not configured for the terminal device, or C-DRX is configured for the terminal device and it is within a C-DRX active time, the indication may be carried in a downlink control information (DCI) format 0_1 or a DCI format 1_1.

A second possibility is as follows: When C-DRX is configured for the terminal device and the indication is before on duration (OnDuration), the indication may be carried in a DCI format 3_0.

Usually, the network device may send a PDCCH before DRX OnDuration. A DCI format corresponding to the PDCCH may be 3_0. The DCI format may also be referred to as another name (for example, a format 2_6). This is not limited in this disclosure. The PDCCH may carry a wakeup indication to indicate whether a PDCCH needs to be monitored in a C-DRX cycle (cycle) after the PDCCH. If the terminal device is indicated not to wake up, regardless of a specific quantity of cells configured for the terminal device, the terminal device does not monitor a PDCCH in each cell. In addition, the DCI format 3_0 may further indicate dormancy behavior in an SCell, and specifically indicate SCells on which the PDCCH needs to be monitored and SCells on which the PDCCH does not need to be monitored. The indication for the dormancy behavior does not affect the PCell.

Currently, the dormancy behavior is implemented based on BWP switching. However, a current standard discusses only that the network device indicates the dormancy behavior of the terminal device by using indication information, but specific behavior performed by the terminal device after the terminal device receives the indication information is not clear. Based on this, this disclosure provides a communication method, to define specific behavior performed by the terminal device after the terminal device receives, from the network device, indication information indicating that the terminal device needs to work on a non-dormant BWP.

The following describes the communication method in the embodiments of this disclosure in detail with reference to specific embodiments.

Figure 2:
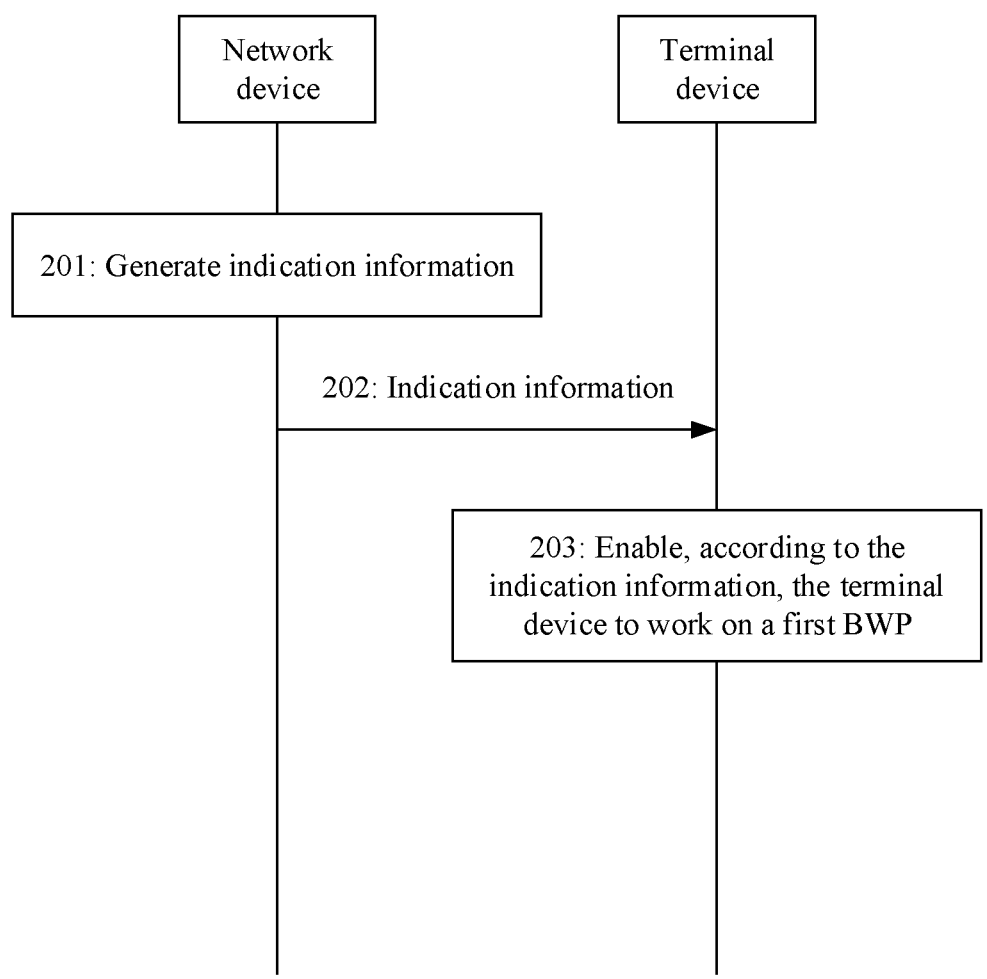
FIG. 2 is a flowchart of a communication method according to this disclosure.

A communication method provided in an embodiment of this disclosure is applicable to the communications system shown in FIG. 1. Referring to FIG. 2, a specific procedure of the method may include the following steps.

Step 201: A network device generates indication information, where the indication information is used to indicate a terminal device to work on a non-dormant BWP in a first secondary cell.

Step 202: The network device sends the indication information to the terminal device.

Specifically, a specific method in which the network device sends the indication information to the terminal device may be: The network device sends the indication information to the terminal device in a primary cell.

Step 203: The terminal device enables, according to the indication information, the terminal device to work on a first BWP, where the first BWP is the non-dormant BWP in the first secondary cell.

Specifically, in this disclosure, the terminal device does not monitor a PDCCH signal on a dormant BWP, and monitors a PDCCH signal on a non-dormant BWP.

For example, that the terminal device enables the terminal device to work on the first BWP may have the following five cases.

Case a1: The terminal device switches from a second BWP to the first BWP, where the second BWP is a dormant BWP or a non-dormant BWP currently used by the terminal device, and the first BWP is a first active BWP in the first secondary cell. The first active BWP is a specific BWP. When a secondary cell is configured for the terminal device, a first active BWP in the secondary cell may be configured for the terminal device, to determine a specific BWP to be used when the terminal device works in the secondary cell for the first time.

In the case a1, the network device configures the first active BWP in the first secondary cell, where the first active BWP is a BWP to which the terminal device needs to switch as long as the terminal device receives the indication information. Regardless of whether the terminal device currently works on the dormant BWP or the non-dormant BWP in the first secondary cell, as long as the terminal device does not work on the first active BWP, the terminal device switches to and works on the first active BWP in the first secondary cell.

Case a2: The terminal device switches from a third BWP to the first BWP, where the third BWP is a dormant BWP or a non-dormant BWP currently used by the terminal device, and the first BWP is a BWP that is configured by the network device and to which the terminal device needs to switch.

In the case a2, the network device configures a specific BWP (which is the first BWP herein) in the first secondary cell, where the specific BWP is a BWP to which the terminal device needs to switch as long as the terminal device receives the indication information. Regardless of whether the terminal device currently works on the dormant BWP or the non-dormant BWP in the first secondary cell, as long as the terminal device does not work on the configured specific BWP, the terminal device switches to and works on the specific BWP in the first secondary cell.

Case a3: The terminal device switches from a fourth BWP to the first BWP, where the fourth BWP is a dormant BWP in the first secondary cell, and the terminal device works on the first BWP before switching to the fourth BWP.

Case a4: The terminal device switches from a fifth BWP to the first BWP, where the fifth BWP is a dormant BWP in the first secondary cell, and the first BWP is associated with the fifth BWP.

For example, there are several pairs of BWPs in the first secondary cell, and each pair of BWPs are associated with each other. To be specific, each pair of BWPs are one dormant BWP and one non-dormant BWP that are associated with each other. When receiving the indication information, the terminal device switches between only two BWPs that are associated with each other.

Case a5: When the terminal device currently uses the first BWP, the terminal device keeps the terminal device working on the first BWP.

Specifically, in the case a5, a possible scenario is that the first BWP is neither a first active BWP in the first secondary cell nor a BWP that is configured by the network device and to which the terminal device needs to switch. The method in the case 5a is used only in this scenario. Another possible scenario is that regardless of which BWP the first BWP is, as long as the first BWP is a non-dormant BWP, the method in the case a5 may be used.

Correspondingly, in the foregoing five possible cases, the network device separately performs the following operations.

In the case a1, the network device determines that the terminal device switches from the second BWP to the first BWP, where the second BWP is the dormant BWP or the non-dormant BWP currently used by the terminal device, and the first BWP is the first active BWP in the first secondary cell.

In the case a2, the network device determines that the terminal device switches from the third BWP to the first BWP, where the third BWP is the dormant BWP or the non-dormant BWP currently used by the terminal device, and the first BWP is the BWP that is configured by the network device and to which the terminal device needs to switch.

In the case a3, the network device determines that the terminal device switches from the fourth BWP to the first BWP, where the fourth BWP is the dormant BWP in the first secondary cell, and the terminal device works on the first BWP before switching to the fourth BWP.

In the case a4, the network device determines that the terminal device switches from the fifth BWP to the first BWP, where the fifth BWP is the dormant BWP in the first secondary cell, and the first BWP is associated with the fifth BWP.

In the case a5, when the terminal device currently uses the first BWP, the network device determines that the terminal device keeps the terminal device working on the first BWP.

It should be noted that the foregoing describes only a case that the indication information is used to indicate the terminal device to work on the non-dormant bandwidth part BWP in the first secondary cell. It should be understood that the first secondary cell is an example used to describe the communication method provided in this disclosure. During specific implementation, the indication information is used to indicate the terminal device to work on a non-dormant BWP in one or more secondary cells, or to work on a dormant BWP in one or more secondary cells. To be specific, the first secondary cell is any one of the one or more secondary cells. When the indication information is used to indicate the terminal device to work on a non-dormant BWP in any one of the one or more secondary cells, the communication method in which the first secondary cell is used as an example may be used.

According to the communication method provided in this embodiment of this disclosure, when receiving indication information used by the network device to indicate the terminal device to work on a non-dormant BWP in a secondary cell, the terminal device can determine a specific BWP on which the terminal device is to work, and work on the corresponding BWP.

Based on the foregoing embodiment, an overall idea of the communication method provided in this disclosure may be understood as follows:

The network device indicates that the terminal device needs to switch to a non-dormant BWP in a specific SCell. For example, if the terminal device works on a BWP 1 when receiving an indication, there are the following several cases.

If the BWP 1 is a dormant BWP, the terminal device switches to and works on a BWP 2 after receiving the indication, where the BWP 2 is a BWP used when the terminal device switches from the dormant BWP, for example, a first active BWP, a specific (default) non-dormant BWP configured by the network device, or an active BWP used by the terminal device before the terminal device switches to the dormant BWP.

If the BWP 1 is a non-dormant BWP but is not a BWP used when the terminal device switches from a dormant BWP, the terminal device switches to and works on a BWP 2 after receiving the indication, where the BWP 2 is the BWP used when the terminal device switches from the dormant BWP, for example, a first active BWP, or a default non-dormant BWP configured by the network device; or the terminal device still works on the BWP 1.

If the BWP 1 is a non-dormant BWP and is a BWP used when the terminal device switches from a dormant BWP, the terminal device still works on the BWP 1.

Based on the foregoing description, the following specific example is used to describe the communication method provided in this disclosure. In the following example, an example in which the terminal device is UE is used for description.

For example, a plurality of BWPs may be configured for the UE in one cell. It is assumed that there are a plurality of non-dormant BWPs in one SCell. The following uses a specific example to describe which BWP the UE should switch to when the UE receives, in a PCell, an indication indicating that the UE needs to monitor a PDCCH in the SCell (that is, needs to work on a non-dormant BWP).

For example, it is assumed that four BWPs are currently configured for the UE, where a BWP 1, a BWP 2, and a BWP 3 are normal BWPs (that is, BWPs on which a PDCCH needs to be monitored, namely, non-dormant BWPs), and a BWP 4 is a dormant BWP (that is, a BWP on which a PDCCH does not need to be monitored). The UE initially works on the BWP 2, and at a first moment, the UE receives an indication in the PCell, and needs to switch to a dormant BWP (that is, the BWP 4).

At a second moment, the UE receives an indication in the PCell, and needs to switch from the dormant BWP. In this case, for determining of a specific BWP to which the UE switches from the BWP 4, there are the following three possible solutions:

Solution 1: The UE switches to the BWP 1, and the BWP 1 is a first active BWP (in other technology, there is necessarily one first active BWP in one SCell, and after the SCell is activated, the UE works on the first active BWP).

Solution 2: The UE switches to the BWP 2, that is, an active BWP (a non-dormant BWP) used by the UE before the UE switches to the dormant BWP (the BWP 4).

Solution 3: The UE switches to the BWP 3, and the BWP 3 is a BWP that is configured by the network device and that is used when the UE switches from the dormant BWP, that is, a BWP that is configured by the network device and to which the UE needs to switch.

Figure 3:
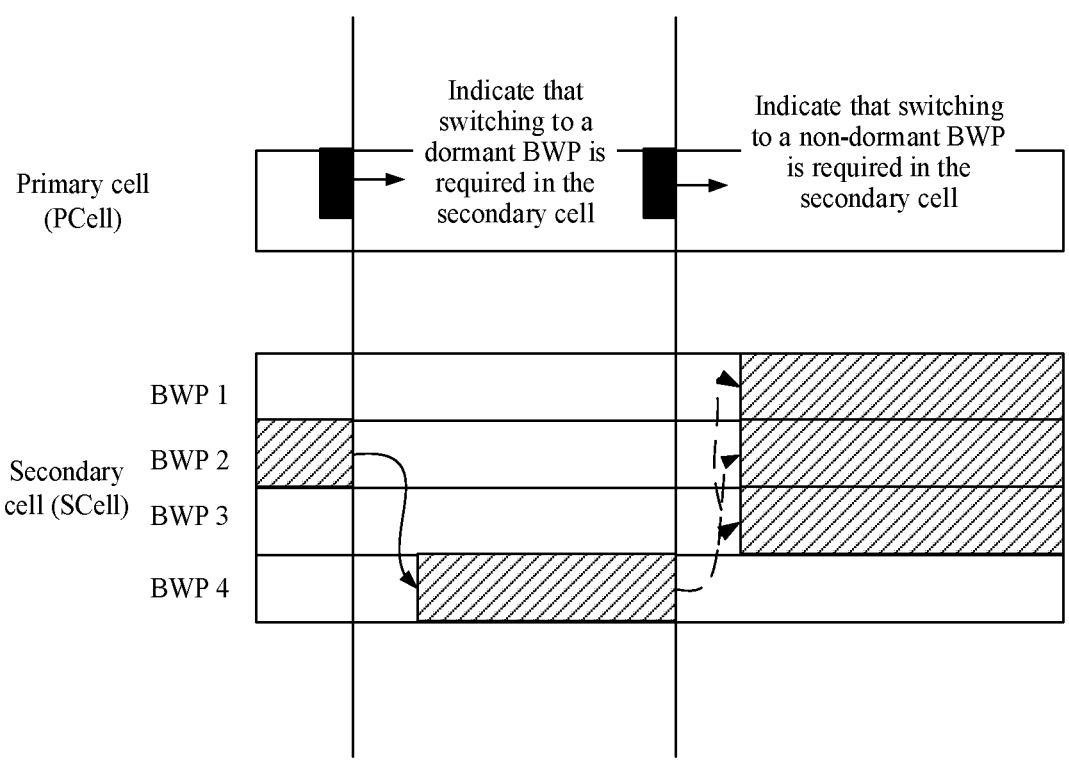
FIG. 3 is a schematic diagram of a type of BWP switching according to this disclosure.

For example, the foregoing switching process may be shown in FIG. 3.

In another example, four normal BWPs (non-dormant BWPs) are configured for the UE, and are a BWP 1, a BWP 2, a BWP 3, and a BWP 4. In addition, four dormant BWPs are further configured for the UE, and are a BWP 5, a BWP 6, a BWP 7, and a BWP 8, which respectively correspond to the BWP 1, the BWP 2, the BWP 3, and the BWP 4. When an active BWP of the UE is the BWP 1, if the UE receives an indication from the network device, and needs to switch to a dormant BWP, the UE switches to the BWP 5. When an active BWP of the UE is the BWP 5, if the UE receives an indication from the network device, and needs to switch to a non-dormant BWP, the UE switches to the BWP 1. In other words, the UE switches to a non-dormant BWP associated with a current dormant BWP.

For another example, when the UE works on a non-dormant BWP, if the UE receives, in the PCell, an indication indicating that the UE needs to monitor a PDCCH in the SCell, whether the UE should switch between BWPs is specifically described below.

It is assumed that four BWPs are currently configured for the UE, where a BWP 1, a BWP 2, and a BWP 3 are normal BWPs (that is, BWPs on which a PDCCH needs to be monitored, namely, non-dormant BWPs), and a BWP 4 is a dormant BWP (that is, a BWP on which a PDCCH does not need to be monitored). The BWP 1 is a BWP used when the UE switches from a dormant BWP in the SCell (or the first active BWP in the solution 1 in the foregoing example, or the BWP configured by a network side in the solution 3 in the foregoing example).

If a current active BWP of the UE is the BWP 2, when the UE receives an indication in the PCell, and needs to switch from the dormant BWP in the SCell, behavior of the UE may be implemented by using the following two solutions:

Solution 1: The UE switches from the BWP 2 to the BWP 1.

In this solution, it may be directly defined that the indication in the PCell is used for switching only between the dormant BWP (the BWP 4) and a specific non-dormant BWP (the BWP 1).

Solution 2: Keep the BWP 2 as the active BWP.

In this solution, the UE may keep the active BWP unchanged, to avoid a delay caused by BWP switching.

Figure 4:
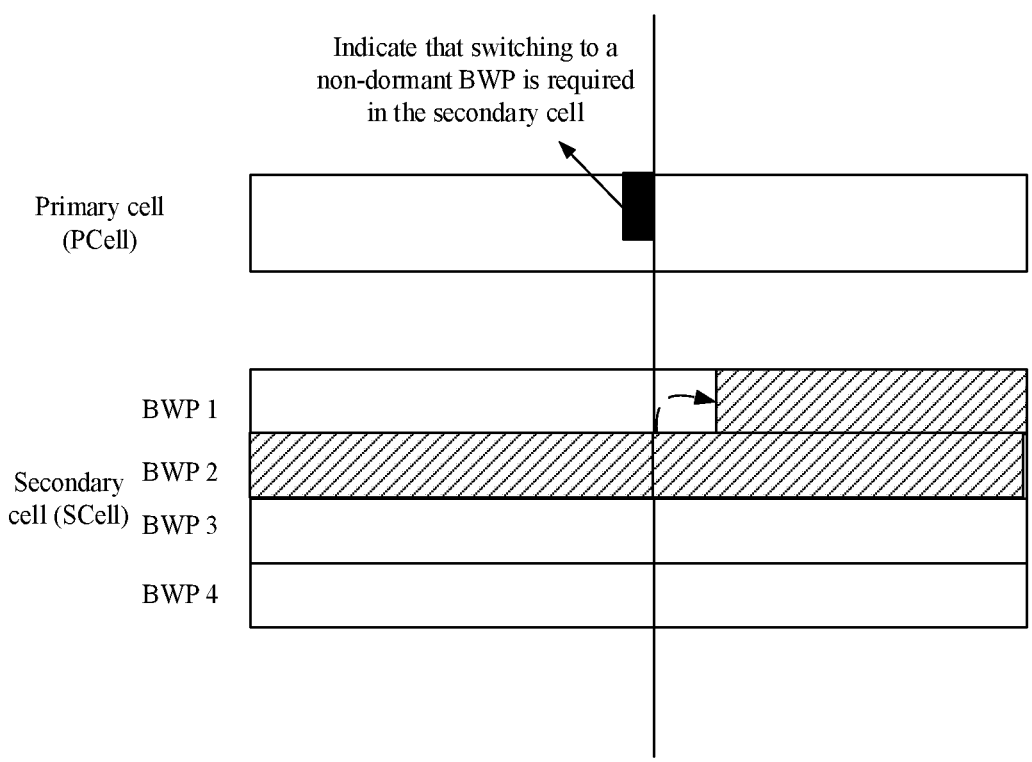
FIG. 4 is a schematic diagram of another type of BWP switching according to this disclosure.

Specifically, the foregoing switching process may be shown in FIG. 4.

Figure 5:
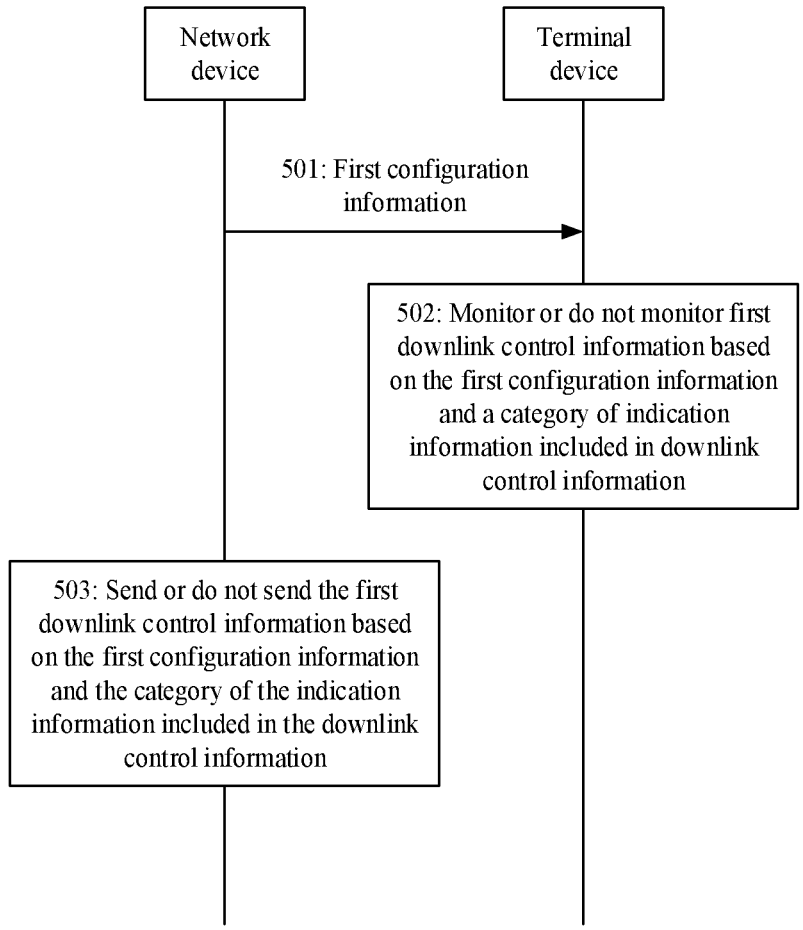
FIG. 5 is a flowchart of another communication method according to this disclosure.

An embodiment of this disclosure further provides another communication method, applicable to the communications system shown in FIG. 1. Referring to FIG. 5, a specific procedure of the method may include the following steps.

Step 501: A terminal device receives first configuration information from a network device, where the first configuration information is used to configure or indicate the terminal device to receive downlink control information.

A category of indication information included in the downlink control information includes at least one of first indication information or second indication information, or a category of indication information included in the downlink control information includes neither first indication information nor second indication information.

For example, there may be the following scenarios in which the category of the indication information included in the downlink control information includes at least one of the first indication information or the second indication information.

In a first scenario, the category of the indication information included in the downlink control information includes at least the first indication information.

In a second scenario, the category of the indication information included in the downlink control information includes the second indication information.

In a third scenario, the category of the indication information included in the downlink control information includes the first indication information and the second indication information.

In a fourth scenario, the category of the indication information included in the downlink control information may be any case in the foregoing three scenarios, the three cases may randomly exist, and the category of the indication information included in the downlink control information is not limited.

The first indication information is used to indicate the terminal device whether to start an on duration timer in a first DRX cycle, and the second indication information is used to indicate the terminal device whether to perform a dormancy operation in a secondary cell.

Step 502: The terminal device monitors or does not monitor first downlink control information based on the first configuration information and the category of the indication information included in the downlink control information.

Step 503: The network device sends or does not send the first downlink control information based on the first configuration information and the category of the indication information included in the downlink control information.

It should be understood that a sequence of step 502 and step 503 is merely an example, and the sequence of the two steps is not limited in this disclosure.

In a possible implementation, when the category of the indication information included in the downlink control information includes the first indication information, the terminal device receives second configuration information from the network device, and the second configuration information is used to configure that the category of the indication information included in the downlink control information includes the first indication information. Alternatively, the category of the indication information included in the downlink control information includes the first indication information by default.

In an example, the terminal device monitors the first downlink control information; and when the first indication information is used to indicate the terminal device to start the on duration timer in the first DRX cycle, the terminal device starts the on duration timer in the first DRX cycle, and monitors a PDCCH in each cell within on duration in the first DRX cycle; or when the first indication information is used to indicate the terminal device not to start the on duration timer in the first DRX cycle, the terminal device does not start the on duration timer in the first DRX cycle, and does not monitor a PDCCH in each cell within on duration in the first DRX cycle.

Correspondingly, the network device sends the first downlink control information to the terminal device; and when the first indication information is used to indicate the terminal device to start the on duration timer in the first DRX cycle, the network device sends a PDCCH to the terminal device in each cell within the on duration in the first DRX cycle; or when the first indication information is used to indicate the terminal device not to start the on duration timer in the first DRX cycle, the network device does not send a PDCCH to the terminal device in each cell within the on duration in the first DRX cycle.

In another example, when the category of the indication information included in the downlink control information includes the first indication information and the second indication information, the terminal device monitors the first downlink control information; and when the first indication information is used to indicate the terminal device to start the on duration timer in the first DRX cycle, the terminal device starts the on duration timer in the first DRX cycle, monitors a physical downlink control channel PDCCH in a primary cell within on duration in the first DRX cycle, and determines, based on the second indication information, whether to monitor a PDCCH in the secondary cell within the on duration in the first DRX cycle; or when the first indication information is used to indicate the terminal device not to start the on duration timer in the first DRX cycle, the terminal device does not start the on duration timer in the first DRX cycle, and does not monitor a PDCCH in each cell within on duration in the first DRX cycle.

Correspondingly, when the first indication information is used to indicate the terminal device to start the on duration timer in the first DRX cycle, the network device may send a PDCCH to the terminal device in the primary cell within the on duration in the first DRX cycle, and determine the second indication information based on whether the network device can send a PDCCH to the terminal device in the secondary cell within the on duration in the first DRX cycle; or when the first indication information is used to indicate the terminal device not to start the on duration timer in the first DRX cycle, the network device does not send a PDCCH in each cell within the on duration in the first DRX cycle; and the network device sends the first downlink control information to the terminal device.

That the network device determines the second indication information based on whether the network device can send a PDCCH to the terminal device in the secondary cell within the on duration in the first DRX cycle may be specifically as follows: When the network device can send the PDCCH to the terminal device in the secondary cell within the on duration in the first DRX cycle, the network device determines that the second indication information is used to indicate that the network can send the PDCCH to the terminal device in the secondary cell within the on duration in the first DRX cycle. For example, the network device may determine that the second indication information is "1". When the network device does not send the PDCCH to the terminal device in the secondary cell within the on duration in the first DRX cycle, the second indication information is used to indicate that the network device cannot send the PDCCH to the terminal device in the secondary cell within the on duration in the first DRX cycle. For example, the network device may determine that the second indication information is "0".

In still another example, when the category of the indication information included in the downlink control information includes the second indication information, the terminal device monitors the first downlink control information; the terminal device starts the on duration timer in the first DRX cycle, and monitors a PDCCH in a primary cell within on duration in the first DRX cycle; and the terminal device determines, based on the second indication information, whether to monitor a PDCCH in the secondary cell within the on duration in the first DRX cycle.

Correspondingly, the network device sends a PDCCH to the terminal device in the primary cell within the on duration in the first DRX cycle; the network device determines the second indication information based on whether the network device can send a PDCCH to the terminal device in the secondary cell within the on duration in the first DRX cycle; and the network device sends the first downlink control information to the terminal device.

Specifically, a specific case in which the network device determines the second indication information based on whether the network device can send a PDCCH to the terminal device in the secondary cell within the on duration in the first DRX cycle is similar to the case in the previous example (namely, the foregoing another example). Mutual reference may be made, and details are not described herein again.

In yet another example, when the category of the indication information included in the downlink control information includes neither the first indication information nor the second indication information, the terminal device does not monitor the first downlink control information.

Correspondingly, the network device does not send the first downlink control information to the terminal device.

Figure 6:
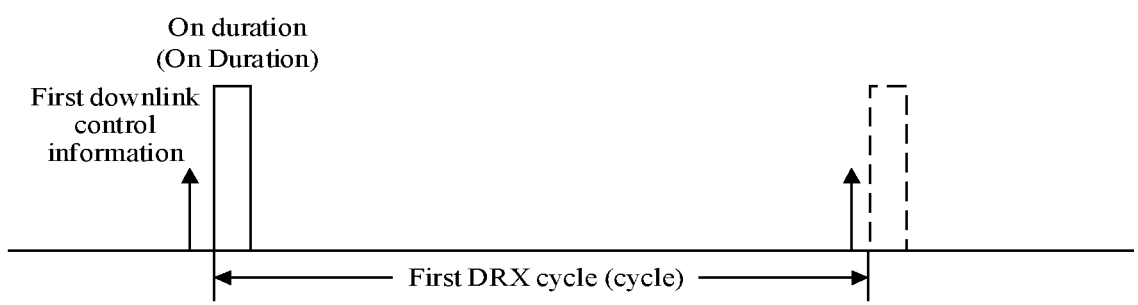
FIG. 6 is a schematic diagram of a location of first downlink control information according to this disclosure.

In an optional implementation, a sending moment of the first downlink control information is before a start moment of the on duration in the first DRX cycle, for example, as shown in FIG. 6.

According to the communication method provided in this embodiment of this disclosure, specific behavior about whether the terminal device monitors the downlink control information is determined.

Based on the foregoing embodiment, when the downlink control information is in a DCI format 3_0, and the DCI format 3_0 indicates wakeup and dormancy behavior (that is, when a category of indication information included in the DCI format 3_0 may be the first indication information and the second indication information), there may be the following four indication function combinations:

Combination 1: wakeup+dormancy.
Combination 2: wakeup only.
Combination 3: dormancy only.
Combination 4: no wakeup or dormancy.

UE behavior in the combination 1 and the combination 2 is relatively common currently, and is not described in detail.

For the combination 3, UE has two types of possible behavior.

When the combination is an invalid combination, that is, when the UE is configured to monitor DCI, the UE needs to receive at least a wakeup indication in the DCI.

When the combination is a valid combination, UE behavior should be that monitoring always needs to be performed in a PCell of the UE within OnDuration, and whether monitoring is performed in an SCell is determined based on a specific indication.

For the combination 4, UE also has two types of possible behavior.

When the combination is an invalid combination, that is, when the UE is configured to monitor DCI, at least one indication function needs to be configured for the UE.

When the combination is a valid combination, and this case is configured for the UE, even if the UE is configured to monitor DCI, the UE may not monitor the DCI.

Figure 7:
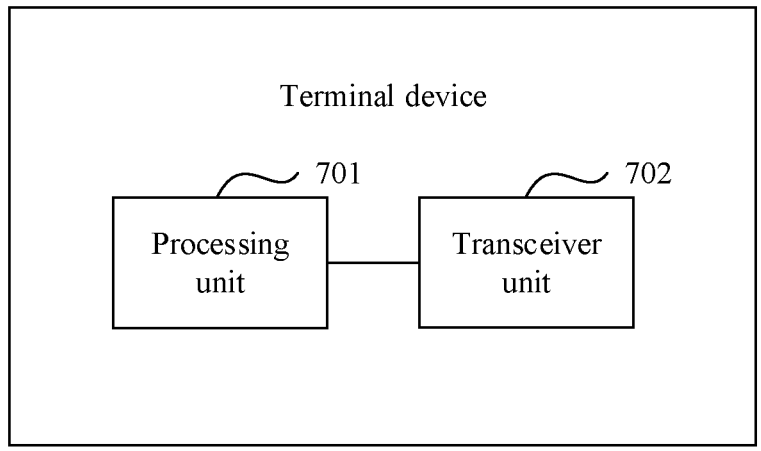
FIG. 7 is a schematic structural diagram of a terminal device according to this disclosure.

Based on the foregoing embodiments, an embodiment of this disclosure further provides a terminal device. The terminal device is used in the communications system shown in FIG. 1. The terminal device may be configured to implement a function of the terminal device in the communication method shown in FIG. 2 or FIG. 5. Referring to FIG. 7, the terminal device may include a processing unit 701 and a transceiver unit 702.

In an embodiment, when the terminal device implements a function of the terminal device in the communication method shown in FIG. 2, details may be as follows.

The transceiver unit 702 is configured to receive indication information from a network device, where the indication information is used to indicate the terminal device to work on a non-dormant bandwidth part BWP in a first secondary cell.

The processing unit 701 is configured to enable, according to the indication information, the terminal device to work on a first BWP, where the first BWP is the non-dormant BWP in the first secondary cell.

In an example, when enabling the terminal device to work on the first BWP, the processing unit 701 is specifically configured to switch from a second BWP to the first BWP, where the second BWP is a dormant BWP or a non-dormant BWP currently used by the terminal device, and the first BWP is a first active BWP in the first secondary cell.

In another example, when enabling the terminal device to work on the first BWP, the processing unit 701 is specifically configured to switch from a third BWP to the first BWP, where the third BWP is a dormant BWP or a non-dormant BWP currently used by the terminal device, and the first BWP is a BWP that is configured by the network device and to which the terminal device needs to switch.

In another example, when enabling the terminal device to work on the first BWP, the processing unit 701 is specifically configured to switch from a fourth BWP to the first BWP, where the fourth BWP is a dormant BWP in the first secondary cell, and the terminal device works on the first BWP before switching to the fourth BWP.

In another example, when enabling the terminal device to work on the first BWP, the processing unit 701 is specifically configured to switch from a fifth BWP to the first BWP, where the fifth BWP is a dormant BWP in the first secondary cell, and the first BWP is associated with the fifth BWP.

In still another example, when enabling the terminal device to work on the first BWP, the processing unit 701 is specifically configured to: when the terminal device currently uses the first BWP, keep the terminal device working on the first BWP. The first BWP is neither a first active BWP in the first secondary cell nor a BWP that is configured by the network device and to which the terminal device needs to switch.

In a specific implementation, when receiving the indication information from the network device, the transceiver unit 702 is specifically configured to receive the indication information from the network device in a primary cell.

In an embodiment, when the terminal device implements a function of the terminal device in the communication method shown in FIG. 5, details may be as follows.

The transceiver unit 702 is configured to receive first configuration information from a network device, where the first configuration information is used to configure or indicate the terminal device to receive downlink control information.

A category of indication information included in the downlink control information includes at least one of first indication information or second indication information, or a category of indication information included in the downlink control information includes neither first indication information nor second indication information.

The first indication information is used to indicate the terminal device whether to start an on duration on duration timer in a first discontinuous reception DRX cycle, and the second indication information is used to indicate the terminal device whether to perform a dormancy operation in a secondary cell.

The processing unit 701 is configured to monitor or not monitor first downlink control information based on the first configuration information and the category of the indication information included in the downlink control information.

In an example, when the category of the indication information included in the downlink control information includes the first indication information, the transceiver unit 702 is further configured to receive second configuration information from the network device, where the second configuration information is used to configure that the category of the indication information included in the downlink control information includes the first indication information; or the category of the indication information included in the downlink control information includes the first indication information by default.

In another example, the processing unit 701 is further configured to: monitor the first downlink control information; and when the first indication information is used to indicate the terminal device to start the on duration timer in the first DRX cycle, start the on duration timer in the first DRX cycle, and monitor a PDCCH in each cell within on duration in the first DRX cycle; or when the first indication information is used to indicate the terminal device not to start the on duration timer in the first DRX cycle, not start the on duration timer in the first DRX cycle, and not monitor a PDCCH in each cell within on duration in the first DRX cycle.

In still another example, when the category of the indication information included in the downlink control information includes the first indication information and the second indication information, the processing unit 701 is further configured to: monitor the first downlink control information; and when the first indication information is used to indicate the terminal device to start the on duration timer in the first DRX cycle, start the on duration timer in the first DRX cycle, monitor a physical downlink control channel PDCCH in a primary cell within on duration in the first DRX cycle, and determine, based on the second indication information, whether to monitor a PDCCH in the secondary cell within the on duration in the first DRX cycle; or when the first indication information is used to indicate the terminal device not to start the on duration timer in the first DRX cycle, not start the on duration timer in the first DRX cycle, and not monitor a PDCCH in each cell within on duration in the first DRX cycle.

In an example, when the category of the indication information included in the downlink control information includes the second indication information, the processing unit 701 is further configured to: monitor the first downlink control information; start the on duration timer in the first DRX cycle, and monitor a PDCCH in a primary cell within on duration in the first DRX cycle; and determine, based on the second indication information, whether to monitor a PDCCH in the secondary cell within the on duration in the first DRX cycle.

In another example, when the category of the indication information included in the downlink control information includes neither the first indication information nor the second indication information, the processing unit 701 is further configured to not monitor the first downlink control information.

In a specific implementation, a sending moment of the first downlink control information is before a start moment of the on duration on duration in the first DRX cycle.

Figure 8:
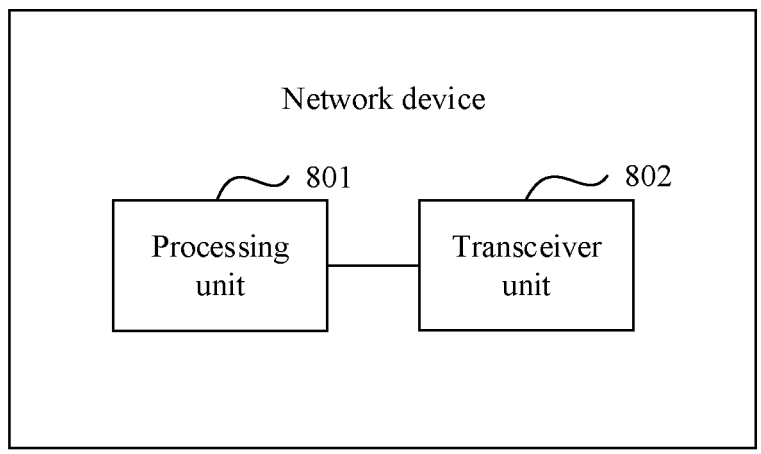
FIG. 8 is a schematic structural diagram of a network device according to this disclosure.

Based on the foregoing embodiments, an embodiment of this disclosure further provides a network device. The network device is used in the communications system shown in FIG. 1. The network device may be configured to implement the communication method shown in FIG. 2 or FIG. 5. Referring to FIG. 8, the network device may include a processing unit 801 and a transceiver unit 802.

In an embodiment, when the network device implements a function of the network device in the communication method shown in FIG. 2, details may be as follows.

The processing unit 801 is configured to generate indication information, where the indication information is used to indicate a terminal device to work on a non-dormant bandwidth part BWP in a first secondary cell.

The transceiver unit 802 is configured to send the indication information to the terminal device, to enable the terminal device to work on a first BWP, where the first BWP is the non-dormant BWP in the first secondary cell.

In an example, the processing unit 801 is further configured to determine that the terminal device switches from a second BWP to the first BWP, where the second BWP is a dormant BWP or a non-dormant BWP currently used by the terminal device, and the first BWP is a first active BWP in the first secondary cell.

In another example, the processing unit 801 is further configured to determine that the terminal device switches from a third BWP to the first BWP, where the third BWP is a dormant BWP or a non-dormant BWP currently used by the terminal device, and the first BWP is a BWP that is configured by the network device and to which the terminal device needs to switch.

In still another example, the processing unit 801 is further configured to determine that the terminal device switches from a fourth BWP to the first BWP, where the fourth BWP is a dormant BWP in the first secondary cell, and the terminal device works on the first BWP before switching to the fourth BWP.

In yet another example, the processing unit 801 is further configured to determine that the terminal device switches from a fifth BWP to the first BWP, where the fifth BWP is a dormant BWP in the first secondary cell, and the first BWP is associated with the fifth BWP.

In another example, the processing unit 801 is further configured to: when the terminal device currently uses the first BWP, determine that the terminal device keeps the terminal device working on the first BWP. The first BWP is neither a first active BWP in the first secondary cell nor a BWP that is configured by the network device and to which the terminal device needs to switch.

In an optional implementation, when sending the indication information to the terminal device, the transceiver unit 802 is specifically configured to send the indication information to the terminal device in a primary cell.

In another embodiment, when the network device implements a function of the network device in the communication method shown in FIG. 5, details may be as follows.

The transceiver unit 802 is configured to send first configuration information to a terminal device, where the first configuration information is used to configure or indicate the terminal device to receive downlink control information.

A category of indication information included in the downlink control information includes at least one of first indication information or second indication information, or a category of indication information included in the downlink control information includes neither first indication information nor second indication information.

The first indication information is used to indicate the terminal device whether to start an on duration on duration timer in a first discontinuous reception DRX cycle, and the second indication information is used to indicate the terminal device whether to perform a dormancy operation in a secondary cell.

The processing unit 801 is configured to send or not send first downlink control information based on the first configuration information and the category of the indication information included in the downlink control information.

In an example, when the category of the indication information included in the downlink control information includes the first indication information, the transceiver unit 802 is further configured to send second configuration information to the terminal device, where the second configuration information is used to configure that the category of the indication information included in the downlink control information includes the first indication information; or the category of the indication information included in the downlink control information includes the first indication information by default.

In another example, the transceiver unit 802 is further configured to: send the first downlink control information to the terminal device; and when the first indication information is used to indicate the terminal device to start the on duration timer in the first DRX cycle, send a PDCCH to the terminal device in each cell within on duration in the first DRX cycle; or when the first indication information is used to indicate the terminal device not to start the on duration timer in the first DRX cycle, not send a PDCCH to the terminal device in each cell within on duration in the first DRX cycle.

In still another example, when the category of the indication information included in the downlink control information includes the first indication information and the second indication information, if the first indication information is used to indicate the terminal device to start the on duration timer in the first DRX cycle, the transceiver unit 802 is further configured to send a PDCCH to the terminal device in a primary cell within on duration in the first DRX cycle, and the processing unit 801 is further configured to determine the second indication information based on whether the network device sends a PDCCH to the terminal device in the secondary cell within the on duration in the first DRX cycle; or if the first indication information is used to indicate the terminal device not to start the on duration timer in the first DRX cycle, the transceiver unit 802 is further configured to not send a PDCCH in each cell within on duration in the first DRX cycle; and the transceiver unit 802 is further configured to send the first downlink control information to the terminal device.

In yet another example, when the category of the indication information included in the downlink control information includes the second indication information, the transceiver unit 802 is further configured to send a PDCCH to the terminal device in a primary cell within on duration in the first DRX cycle; the processing unit 801 is further configured to determine the second indication information based on whether the network device sends a PDCCH to the terminal device in the secondary cell within the on duration in the first DRX cycle; and the transceiver unit 802 is further configured to send the first downlink control information to the terminal device.

In still another example, when the category of the indication information included in the downlink control information includes neither the first indication information nor the second indication information, the transceiver unit 802 is further configured to not send the first downlink control information to the terminal device.

In an optional implementation, a sending moment of the first downlink control information is before a start moment of the on duration on duration in the first DRX cycle.

It should be noted that, in the embodiments of this disclosure, division into units is an example, and is merely logical function division. During actual implementation, there may be another division manner. Function units in the embodiments of this disclosure may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a computer-readable storage medium. Based on such an understanding, the technical solutions of this disclosure essentially, or the part contributing to the conventional technology, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments of this disclosure. The foregoing storage medium includes any medium that can store program code, such as a Universal Serial Bus (USB) flash drive, a removable hard disk, a read-only memory (ROM), a random-access memory (RAM), a magnetic disk, or a compact disc.

Figure 9:
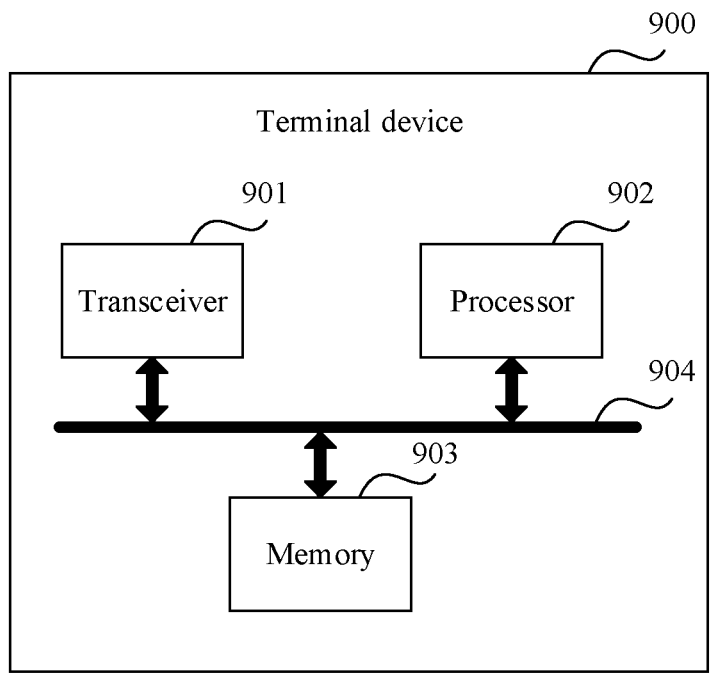
FIG. 9 is a schematic structural diagram of a terminal device according to this disclosure.

Based on the foregoing embodiments, an embodiment of this disclosure further provides a terminal device. The terminal device is configured to implement a function of the terminal device in the communication method shown in FIG. 2 or FIG. 5. Referring to FIG. 9, the terminal device 900 includes a transceiver 901 and a processor 902.

The processor 902 may be a central processing unit (CPU), a network processor (NP), or a combination of a CPU and an NP. The processor 902 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 902 may implement the foregoing function by hardware or by hardware executing corresponding software.

The transceiver 901 and the processor 902 are connected to each other. Optionally, the transceiver 901 and the processor 902 are connected to each other by using a bus 904. The bus 904 may be a Peripheral Component Interconnect (PCI) bus, an Extended Industry Standard Architecure (EISA) bus, or the like. The bus may be classified into an address bus, a data bus, a control bus, and the like. For ease of representation, only one thick line is used to represent the bus in FIG. 9, but this does not mean that there is only one bus or only one type of bus.

Optionally, the terminal device may further include a memory 903, and the memory 903 is configured to store a program and the like. Specifically, the program may include program code, and the program code includes computer operation instructions. The memory 903 may include a RAM, and may further include a non-volatile memory, for example, at least one magnetic disk memory. The processor 902 performs the application program stored in the memory 903 to implement the foregoing function, so as to implement the communication method shown in FIG. 2 or FIG. 5.

In an embodiment, when the terminal device implements the communication method shown in FIG. 2, the transceiver 901 may implement sending and receiving operations performed by the terminal device in the embodiment shown in FIG. 2, and the processor 902 may implement an operation other than the sending and receiving operations performed by the terminal device in the embodiment shown in FIG. 2. For specific related descriptions, refer to the related descriptions in the foregoing embodiments. Details are not described herein again.

In another embodiment, when the terminal device implements the communication method shown in FIG. 5, the transceiver 901 may implement sending and receiving operations performed by the terminal device in the embodiment shown in FIG. 5, and the processor 902 may implement an operation other than the sending and receiving operations performed by the terminal device in the embodiment shown in FIG. 5. For specific related descriptions, refer to the related descriptions in the foregoing embodiments. Details are not described herein again.

Figure 10:
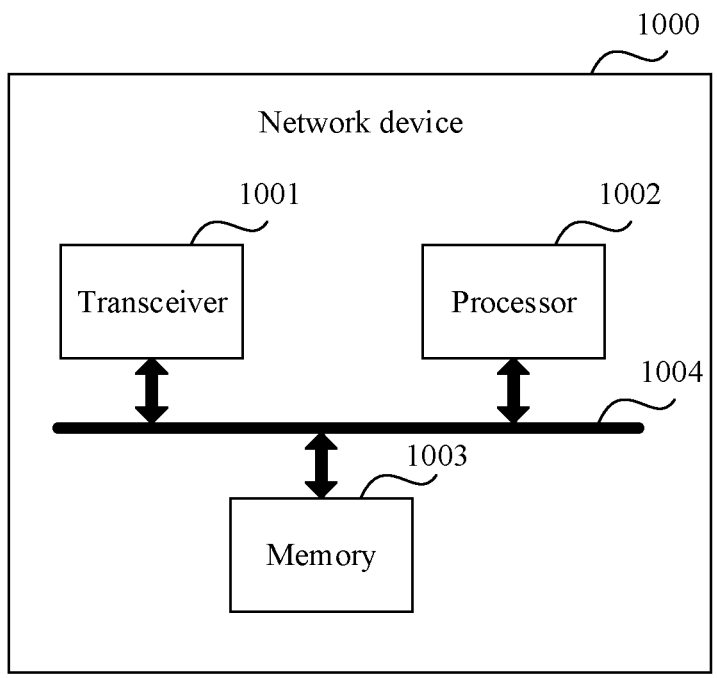
FIG. 10 is a schematic structural diagram of a network device according to this disclosure.

Based on the foregoing embodiments, an embodiment of this disclosure further provides a network device. The network device is configured to implement a function of the network device in the communication method shown in FIG. 2 or FIG. 5. Referring to FIG. 10, the network device 1000 includes a transceiver 1001 and a processor 1002.

The processor 1002 may be a CPU, an NP, or a combination of a CPU and an NP. The processor 1002 may further include a hardware chip. The hardware chip may be an ASIC, a PLD, or a combination thereof. The PLD may be a CPLD, an FPGA, GAL, or any combination thereof. The processor 1002 may implement the foregoing function by hardware or by hardware executing corresponding software.

The transceiver 1001 and the processor 1002 are connected to each other. Optionally, the transceiver 1001 and the processor 1002 are connected to each other by using a bus 1004. The bus 1004 may be a PCI bus, an EISA bus, or the like. The bus may be classified into an address bus, a data bus, a control bus, and the like. For ease of representation, only one thick line is used to represent the bus in FIG. 10, but this does not mean that there is only one bus or only one type of bus.

Optionally, the network device may further include a memory 1003, and the memory 1003 is configured to store a program and the like. Specifically, the program may include program code, and the program code includes computer operation instructions. The memory 1003 may include a RAM, and may further include a non-volatile memory, for example, at least one magnetic disk memory. The processor 1002 performs the application program stored in the memory 1003 to implement the foregoing function, so as to implement the communication method shown in FIG. 2 or FIG. 5.

In an embodiment, when the network device implements the communication method shown in FIG. 2, the transceiver 1001 may implement sending and receiving operations performed by the network device in the embodiment shown in FIG. 2, and the processor 1002 may implement an operation other than the sending and receiving operations performed by the network device in the embodiment shown in FIG. 2. For specific related descriptions, refer to the related descriptions in the foregoing embodiments. Details are not described herein again.

In another embodiment, when the network device implements the communication method shown in FIG. 5, the transceiver 1001 may implement sending and receiving operations performed by the network device in the embodiment shown in FIG. 5, and the processor 1002 may implement an operation other than the sending and receiving operations performed by the network device in the embodiment shown in FIG. 5. For specific related descriptions, refer to the related descriptions in the foregoing embodiments. Details are not described herein again.

With reference to the foregoing description, this disclosure provides the following embodiments.

Embodiment 1: A communication method includes: receiving, by a terminal device, indication information from a network device, where the indication information is used to indicate the terminal device to work on a non-dormant bandwidth part BWP in a first secondary cell; and enabling, by the terminal device according to the indication information, the terminal device to work on a first BWP, where the first BWP is the non-dormant BWP in the first secondary cell.

Embodiment 2: In the method according to Embodiment 1, the enabling, by the terminal device, the terminal device to work on a first BWP includes: switching, by the terminal device, from a second BWP to the first BWP, where the second BWP is a dormant BWP or a non-dormant BWP currently used by the terminal device, and the first BWP is a first active BWP in the first secondary cell.

Embodiment 3: In the method according to Embodiment 1, the enabling, by the terminal device, the terminal device to work on a first BWP includes: switching, by the terminal device, from a third BWP to the first BWP, where the third BWP is a dormant BWP or a non-dormant BWP currently used by the terminal device, and the first BWP is a BWP that is configured by the network device and to which the terminal device needs to switch.

Embodiment 4: In the method according to Embodiment 1, the enabling, by the terminal device, the terminal device to work on a first BWP includes: switching, by the terminal device, from a fourth BWP to the first BWP, where the fourth BWP is a dormant BWP in the first secondary cell, and the terminal device works on the first BWP before switching to the fourth BWP.

Embodiment 5: In the method according to Embodiment 1, the enabling, by the terminal device, the terminal device to work on a first BWP includes: switching, by the terminal device, from a fifth BWP to the first BWP, where the fifth BWP is a dormant BWP in the first secondary cell, and the first BWP is associated with the fifth BWP.

Embodiment 6: In the method according to Embodiment 1, the enabling, by the terminal device, the terminal device to work on a first BWP includes: when the terminal device currently uses the first BWP, keeping, by the terminal device, the terminal device working on the first BWP.

Embodiment 7: In the method according to Embodiment 6, the first BWP is neither a first active BWP in the first secondary cell nor a BWP that is configured by the network device and to which the terminal device needs to switch.

Embodiment 8: In the method according to any one of Embodiment 1 to Embodiment 7, the receiving, by a terminal device, indication information from a network device includes: receiving, by the terminal device, the indication information from the network device in a primary cell.

Embodiment 9: A communication method includes: generating, by a network device, indication information, where the indication information is used to indicate a terminal device to work on a non-dormant bandwidth part BWP in a first secondary cell; and sending, by the network device, the indication information to the terminal device, to enable the terminal device to work on a first BWP, where the first BWP is the non-dormant BWP in the first secondary cell.

Embodiment 10: In the method according to Embodiment 9, the method further includes: determining, by the network device, that the terminal device switches from a second BWP to the first BWP, where the second BWP is a dormant BWP or a non-dormant BWP currently used by the terminal device, and the first BWP is a first active BWP in the first secondary cell.

Embodiment 11: In the method according to Embodiment 9, the method further includes: determining, by the network device, that the terminal device switches from a third BWP to the first BWP, where the third BWP is a dormant BWP or a non-dormant BWP currently used by the terminal device, and the first BWP is a BWP that is configured by the network device and to which the terminal device needs to switch.

Embodiment 12: In the method according to Embodiment 9, the method further includes: determining, by the network device, that the terminal device switches from a fourth BWP to the first BWP, where the fourth BWP is a dormant BWP in the first secondary cell, and the terminal device works on the first BWP before switching to the fourth BWP.

Embodiment 13: In the method according to Embodiment 9, the method further includes: determining, by the network device, that the terminal device switches from a fifth BWP to the first BWP, where the fifth BWP is a dormant BWP in the first secondary cell, and the first BWP is associated with the fifth BWP.

Embodiment 14: In the method according to Embodiment 9, the method further includes: when the terminal device currently uses the first BWP, determining, by the network device, that the terminal device keeps the terminal device working on the first BWP.

Embodiment 15: In the method according to Embodiment 14, the first BWP is neither a first active BWP in the first secondary cell nor a BWP that is configured by the network device and to which the terminal device needs to switch.

Embodiment 16: In the method according to any one of Embodiment 9 to Embodiment 15, the sending, by the network device, the indication information to the terminal device includes: sending, by the network device, the indication information to the terminal device in a primary cell.

Embodiment 17: A terminal device includes: a transceiver unit, configured to receive indication information from a network device, where the indication information is used to indicate the terminal device to work on a non-dormant bandwidth part BWP in a first secondary cell; and a processing unit, configured to enable, according to the indication information, the terminal device to work on a first BWP, where the first BWP is the non-dormant BWP in the first secondary cell.

Embodiment 18: In the terminal device according to Embodiment 17, when enabling the terminal device to work on the first BWP, the processing unit is specifically configured to: switch from a second BWP to the first BWP, where the second BWP is a dormant BWP or a non-dormant BWP currently used by the terminal device, and the first BWP is a first active BWP in the first secondary cell.

Embodiment 19: In the terminal device according to Embodiment 17, when enabling the terminal device to work on the first BWP, the processing unit is specifically configured to: switch from a third BWP to the first BWP, where the third BWP is a dormant BWP or a non-dormant BWP currently used by the terminal device, and the first BWP is a BWP that is configured by the network device and to which the terminal device needs to switch.

Embodiment 20: In the terminal device according to Embodiment 17, when enabling the terminal device to work on the first BWP, the processing unit is specifically configured to: switch from a fourth BWP to the first BWP, where the fourth BWP is a dormant BWP in the first secondary cell, and the terminal device works on the first BWP before switching to the fourth BWP.

Embodiment 21: In the terminal device according to Embodiment 17, when enabling the terminal device to work on the first BWP, the processing unit is specifically configured to: switch from a fifth BWP to the first BWP, where the fifth BWP is a dormant BWP in the first secondary cell, and the first BWP is associated with the fifth BWP.

Embodiment 22: In the terminal device according to Embodiment 17, when enabling the terminal device to work on the first BWP, the processing unit is specifically configured to: when the terminal device currently uses the first BWP, keep the terminal device working on the first BWP.

Embodiment 23: In the terminal device according to Embodiment 22, the first BWP is neither a first active BWP in the first secondary cell nor a BWP that is configured by the network device and to which the terminal device needs to switch.

Embodiment 24: In the terminal device according to any one of Embodiment 17 to Embodiment 23, when receiving the indication information from the network device, the transceiver unit is specifically configured to: receive the indication information from the network device in a primary cell.

Embodiment 25: A network device includes: a processing unit, configured to generate indication information, where the indication information is used to indicate a terminal device to work on a non-dormant bandwidth part BWP in a first secondary cell; and a transceiver unit, configured to send the indication information to the terminal device, to enable the terminal device to work on a first BWP, where the first BWP is the non-dormant BWP in the first secondary cell.

Embodiment 26: In the network device according to Embodiment 25, the processing unit is further configured to: determine that the terminal device switches from a second BWP to the first BWP, where the second BWP is a dormant BWP or a non-dormant BWP currently used by the terminal device, and the first BWP is a first active BWP in the first secondary cell.

Embodiment 27: In the network device according to Embodiment 25, the processing unit is further configured to: determine that the terminal device switches from a third BWP to the first BWP, where the third BWP is a dormant BWP or a non-dormant BWP currently used by the terminal device, and the first BWP is a BWP that is configured by the network device and to which the terminal device needs to switch.

Embodiment 28: In the network device according to Embodiment 25, the processing unit is further configured to: determine that the terminal device switches from a fourth BWP to the first BWP, where the fourth BWP is a dormant BWP in the first secondary cell, and the terminal device works on the first BWP before switching to the fourth BWP.

Embodiment 29: In the network device according to Embodiment 25, the processing unit is further configured to: determine that the terminal device switches from a fifth BWP to the first BWP, where the fifth BWP is a dormant BWP in the first secondary cell, and the first BWP is associated with the fifth BWP.

Embodiment 30: In the network device according to Embodiment 25, the processing unit is further configured to: when the terminal device currently uses the first BWP, determine that the terminal device keeps the terminal device working on the first BWP.

Embodiment 31: In the network device according to Embodiment 30, the first BWP is neither a first active BWP in the first secondary cell nor a BWP that is configured by the network device and to which the terminal device needs to switch.

Embodiment 32: In the network device according to any one of Embodiment 25 to Embodiment 31, when sending the indication information to the terminal device, the transceiver unit is specifically configured to: send the indication information to the terminal device in a primary cell.

Embodiment 33: A terminal device includes: a transceiver, configured to send and receive data; and a processor, configured to enable the terminal device to perform the method according to any one of Embodiment 1 to Embodiment 8.

Embodiment 34: A network device includes: a transceiver, configured to send and receive data; and a processor, configured to enable the network device to perform the method according to any one of Embodiment 9 to Embodiment 16.

Embodiment 35: A communications system includes a network device and a terminal device.

The network device is configured to: generate indication information, and send the indication information to the terminal device, where the indication information is used to indicate the terminal device to work on a non-dormant bandwidth part BWP in a first secondary cell.

The terminal device is configured to enable, according to the indication information, the terminal device to work on a first BWP, where the first BWP is the non-dormant BWP in the first secondary cell.

Embodiment 36: In the communications system according to Embodiment 35, when enabling the terminal device to work on the first BWP, the terminal device is specifically configured to: switch from a second BWP to the first BWP, where the second BWP is a dormant BWP or a non-dormant BWP currently used by the terminal device, and the first BWP is a first active BWP in the first secondary cell.

Embodiment 37: In the communications system according to Embodiment 35 or Embodiment 36, the network device is further configured to: determine that the terminal device switches from the second BWP to the first BWP, where the second BWP is the dormant BWP or the non-dormant BWP currently used by the terminal device, and the first BWP is the first active BWP in the first secondary cell.

Embodiment 38: In the communications system according to Embodiment 35, when enabling the terminal device to work on the first BWP, the terminal device is specifically configured to: switch from a third BWP to the first BWP, where the third BWP is a dormant BWP or a non-dormant BWP currently used by the terminal device, and the first BWP is a BWP that is configured by the network device and to which the terminal device needs to switch.

Embodiment 39: In the communications system according to Embodiment 35 or Embodiment 38, the network device is further configured to: determine that the terminal device switches from the third BWP to the first BWP, where the third BWP is the dormant BWP or the non-dormant BWP currently used by the terminal device, and the first BWP is the BWP that is configured by the network device and to which the terminal device needs to switch.

Embodiment 40: In the communications system according to Embodiment 35, when enabling the terminal device to work on the first BWP, the terminal device is specifically configured to: switch from a fourth BWP to the first BWP, where the fourth BWP is a dormant BWP in the first secondary cell, and the terminal device works on the first BWP before switching to the fourth BWP.

Embodiment 41: In the communications system according to Embodiment 35 or Embodiment 40, the network device is further configured to: determine that the terminal device switches from the fourth BWP to the first BWP, where the fourth BWP is the dormant BWP in the first secondary cell, and the terminal device works on the first BWP before switching to the fourth BWP.

Embodiment 42: In the communications system according to Embodiment 35, when enabling the terminal device to work on the first BWP, the terminal device is specifically configured to: switch from a fifth BWP to the first BWP, where the fifth BWP is a dormant BWP in the first secondary cell, and the first BWP is associated with the fifth BWP.

Embodiment 43: In the communications system according to Embodiment 35 or Embodiment 42, the network device is further configured to: determine that the terminal device switches from the fifth BWP to the first BWP, where the fifth BWP is the dormant BWP in the first secondary cell, and the first BWP is associated with the fifth BWP.

Embodiment 44: In the communications system according to Embodiment 35, when enabling the terminal device to work on the first BWP, the terminal device is specifically configured to: when the terminal device currently uses the first BWP, keep the terminal device working on the first BWP.

Embodiment 45: In the communications system according to Embodiment 35 or Embodiment 44, the network device is further configured to: when the terminal device currently uses the first BWP, determine that the terminal device keeps the terminal device working on the first BWP.

Embodiment 46: In the communications system according to Embodiment 44 or Embodiment 45, the first BWP is neither a first active BWP in the first secondary cell nor a BWP that is configured by the network device and to which the terminal device needs to switch.

Embodiment 47: In the communications system according to any one of Embodiment 35 to Embodiment 46, when receiving the indication information from the network device, the terminal device is specifically configured to: receive the indication information from the network device in a primary cell.

Embodiment 48: A communication method includes: receiving, by a terminal device, first configuration information from a network device, where the first configuration information is used to configure or indicate the terminal device to receive downlink control information, where a category of indication information included in the downlink control information includes at least one of first indication information or second indication information, or a category of indication information included in the downlink control information includes neither first indication information nor second indication information; and the first indication information is used to indicate the terminal device whether to start an on duration on duration timer in a first discontinuous reception DRX cycle, and the second indication information is used to indicate the terminal device whether to perform a dormancy operation in a secondary cell; and monitoring or not monitoring, by the terminal device, first downlink control information based on the first configuration information and the category of the indication information included in the downlink control information.

Embodiment 49: In the method according to Embodiment 48, when the category of the indication information included in the downlink control information includes the first indication information, the method further includes: receiving, by the terminal device, second configuration information from the network device, where the second configuration information is used to configure that the category of the indication information included in the downlink control information includes the first indication information; or the category of the indication information included in the downlink control information includes the first indication information by default.

Embodiment 50: In the method according to Embodiment 48 or Embodiment 49, the method further includes: monitoring, by the terminal device, the first downlink control information; and when the first indication information is used to indicate the terminal device to start the on duration timer in the first DRX cycle, starting, by the terminal device, the on duration timer in the first DRX cycle, and monitoring a PDCCH in each cell within on duration in the first DRX cycle; or when the first indication information is used to indicate the terminal device not to start the on duration timer in the first DRX cycle, not starting, by the terminal device, the on duration timer in the first DRX cycle, and not monitoring a PDCCH in each cell within on duration in the first DRX cycle.

Embodiment 51: In the method according to Embodiment 48, when the category of the indication information included in the downlink control information includes the first indication information and the second indication information, the method further includes: monitoring, by the terminal device, the first downlink control information; and when the first indication information is used to indicate the terminal device to start the on duration timer in the first DRX cycle, starting, by the terminal device, the on duration timer in the first DRX cycle, monitoring a physical downlink control channel PDCCH in a primary cell within on duration in the first DRX cycle, and determining, based on the second indication information, whether to monitor a PDCCH in the secondary cell within the on duration in the first DRX cycle; or when the first indication information is used to indicate the terminal device not to start the on duration timer in the first DRX cycle, not starting, by the terminal device, the on duration timer in the first DRX cycle, and not monitoring a PDCCH in each cell within on duration in the first DRX cycle.

Embodiment 52: In the method according to Embodiment 48, when the category of the indication information included in the downlink control information includes the second indication information, the method further includes: monitoring, by the terminal device, the first downlink control information; starting, by the terminal device, the on duration timer in the first DRX cycle, and monitoring a PDCCH in a primary cell within on duration in the first DRX cycle; and determining, by the terminal device based on the second indication information, whether to monitor a PDCCH in the secondary cell within the on duration in the first DRX cycle.

Embodiment 53: In the method according to Embodiment 48, when the category of the indication information included in the downlink control information includes neither the first indication information nor the second indication information, the method further includes: not monitoring, by the terminal device, the first downlink control information.

Embodiment 54: In the method according to any one of Embodiment 48 to Embodiment 53, a sending moment of the first downlink control information is before a start moment of the on duration on duration in the first DRX cycle.

Embodiment 55: A communication method includes: sending, by a network device, first configuration information to a terminal device, where the first configuration information is used to configure or indicate the terminal device to receive downlink control information, where a category of indication information included in the downlink control information includes at least one of first indication information or second indication information, or a category of indication information included in the downlink control information includes neither first indication information nor second indication information; and the first indication information is used to indicate the terminal device whether to start an on duration on duration timer in a first discontinuous reception DRX cycle, and the second indication information is used to indicate the terminal device whether to perform a dormancy operation in a secondary cell; and sending or not sending, by the network device, first downlink control information based on the first configuration information and the category of the indication information included in the downlink control information.

Embodiment 56: In the method according to Embodiment 55, when the category of the indication information included in the downlink control information includes the first indication information, the method further includes: sending, by the network device, second configuration information to the terminal device, where the second configuration information is used to configure that the category of the indication information included in the downlink control information includes the first indication information; or the category of the indication information included in the downlink control information includes the first indication information by default.

Embodiment 57: In the method according to Embodiment 55 or Embodiment 56, the method further includes: sending, by the network device, the first downlink control information to the terminal device; and when the first indication information is used to indicate the terminal device to start the on duration timer in the first DRX cycle, sending, by the network device, a PDCCH to the terminal device in each cell within on duration in the first DRX cycle; or when the first indication information is used to indicate the terminal device not to start the on duration timer in the first DRX cycle, not sending, by the network device, a PDCCH to the terminal device in each cell within on duration in the first DRX cycle.

Embodiment 58: In the method according to Embodiment 55, when the category of the indication information included in the downlink control information includes the first indication information and the second indication information, the method further includes: when the first indication information is used to indicate the terminal device to start the on duration timer in the first DRX cycle, sending, by the network device, a PDCCH to the terminal device in a primary cell within on duration in the first DRX cycle, and determining the second indication information based on whether the network device sends a PDCCH to the terminal device in the secondary cell within the on duration in the first DRX cycle; or when the first indication information is used to indicate the terminal device not to start the on duration timer in the first DRX cycle, not sending, by the network device, a PDCCH in each cell within on duration in the first DRX cycle; and sending, by the network device, the first downlink control information to the terminal device.

Embodiment 59: In the method according to Embodiment 55, when the category of the indication information included in the downlink control information includes the second indication information, the method further includes: sending, by the network device, a PDCCH to the terminal device in a primary cell within on duration in the first DRX cycle; determining, by the network device, the second indication information based on whether the network device sends a PDCCH to the terminal device in the secondary cell within the on duration in the first DRX cycle; and sending, by the network device, the first downlink control information to the terminal device.

Embodiment 60: In the method according to Embodiment 55, when the category of the indication information included in the downlink control information includes neither the first indication information nor the second indication information, the method further includes: not sending, by the network device, the first downlink control information to the terminal device.

Embodiment 61: In the method according to any one of Embodiment 55 to Embodiment 60, a sending moment of the first downlink control information is before a start moment of the on duration on duration in the first DRX cycle.

Embodiment 62: A terminal device includes: a transceiver unit, configured to receive first configuration information from a network device, where the first configuration information is used to configure or indicate the terminal device to receive downlink control information, where a category of indication information included in the downlink control information includes at least one of first indication information or second indication information, or a category of indication information included in the downlink control information includes neither first indication information nor second indication information; and the first indication information is used to indicate the terminal device whether to start an on duration on duration timer in a first discontinuous reception DRX cycle, and the second indication information is used to indicate the terminal device whether to perform a dormancy operation in a secondary cell; and a processing unit, configured to monitor or not monitor first downlink control information based on the first configuration information and the category of the indication information included in the downlink control information.

Embodiment 63: In the terminal device according to Embodiment 62, when the category of the indication information included in the downlink control information includes the first indication information, the transceiver unit is further configured to receive second configuration information from the network device, where the second configuration information is used to configure that the category of the indication information included in the downlink control information includes the first indication information; or the category of the indication information included in the downlink control information includes the first indication information by default.

Embodiment 64: In the terminal device according to Embodiment 62 or Embodiment 63, the processing unit is further configured to: monitor the first downlink control information; and when the first indication information is used to indicate the terminal device to start the on duration timer in the first DRX cycle, start the on duration timer in the first DRX cycle, and monitor a PDCCH in each cell within on duration in the first DRX cycle; or when the first indication information is used to indicate the terminal device not to start the on duration timer in the first DRX cycle, not start the on duration timer in the first DRX cycle, and not monitor a PDCCH in each cell within on duration in the first DRX cycle.

Embodiment 65: In the terminal device according to Embodiment 62, when the category of the indication information included in the downlink control information includes the first indication information and the second indication information, the processing unit is further configured to: monitor the first downlink control information; and when the first indication information is used to indicate the terminal device to start the on duration timer in the first DRX cycle, start the on duration timer in the first DRX cycle, monitor a physical downlink control channel PDCCH in a primary cell within on duration in the first DRX cycle, and determine, based on the second indication information, whether to monitor a PDCCH in the secondary cell within the on duration in the first DRX cycle; or when the first indication information is used to indicate the terminal device not to start the on duration timer in the first DRX cycle, not start the on duration timer in the first DRX cycle, and not monitor a PDCCH in each cell within on duration in the first DRX cycle.

Embodiment 66: In the terminal device according to Embodiment 62, when the category of the indication information included in the downlink control information includes the second indication information, the processing unit is further configured to: monitor the first downlink control information; start the on duration timer in the first DRX cycle, and monitor a PDCCH in a primary cell within on duration in the first DRX cycle; and determine, based on the second indication information, whether to monitor a PDCCH in the secondary cell within the on duration in the first DRX cycle.

Embodiment 67: In the terminal device according to Embodiment 62, when the category of the indication information included in the downlink control information includes neither the first indication information nor the second indication information, the processing unit is further configured to: not monitor the first downlink control information.

Embodiment 68: In the terminal device according to any one of Embodiment 62 to Embodiment 67, a sending moment of the first downlink control information is before a start moment of the on duration on duration in the first DRX cycle.

Embodiment 69: A network device includes: a transceiver unit, configured to send first configuration information to a terminal device, where the first configuration information is used to configure or indicate the terminal device to receive downlink control information, where a category of indication information included in the downlink control information includes at least one of first indication information or second indication information, or a category of indication information included in the downlink control information includes neither first indication information nor second indication information; and the first indication information is used to indicate the terminal device whether to start an on duration on duration timer in a first discontinuous reception DRX cycle, and the second indication information is used to indicate the terminal device whether to perform a dormancy operation in a secondary cell; and a processing unit, configured to send or not send first downlink control information based on the first configuration information and the category of the indication information included in the downlink control information.

Embodiment 70: In the network device according to Embodiment 69, when the category of the indication information included in the downlink control information includes the first indication information, the transceiver unit is further configured to send second configuration information to the terminal device, where the second configuration information is used to configure that the category of the indication information included in the downlink control information includes the first indication information; or the category of the indication information included in the downlink control information includes the first indication information by default.

Embodiment 71: In the network device according to Embodiment 69 or Embodiment 70, the transceiver unit is further configured to: send the first downlink control information to the terminal device; and when the first indication information is used to indicate the terminal device to start the on duration timer in the first DRX cycle, send a PDCCH to the terminal device in each cell within on duration in the first DRX cycle; or when the first indication information is used to indicate the terminal device not to start the on duration timer in the first DRX cycle, not send a PDCCH to the terminal device in each cell within on duration in the first DRX cycle.

Embodiment 72: In the network device according to Embodiment 69, when the category of the indication information included in the downlink control information includes the first indication information and the second indication information, if the first indication information is used to indicate the terminal device to start the on duration timer in the first DRX cycle, the transceiver unit is further configured to send a PDCCH to the terminal device in a primary cell within on duration in the first DRX cycle, and the processing unit is further configured to determine the second indication information based on whether the network device sends a PDCCH to the terminal device in the secondary cell within the on duration in the first DRX cycle; or if the first indication information is used to indicate the terminal device not to start the on duration timer in the first DRX cycle, the transceiver unit is further configured to not send a PDCCH in each cell within on duration in the first DRX cycle; and the transceiver unit is further configured to send the first downlink control information to the terminal device.

Embodiment 73: In the network device according to Embodiment 69, when the category of the indication information included in the downlink control information includes the second indication information, the transceiver unit is further configured to send a PDCCH to the terminal device in a primary cell within on duration in the first DRX cycle; the processing unit is further configured to determine the second indication information based on whether the network device sends a PDCCH to the terminal device in the secondary cell within the on duration in the first DRX cycle; and the transceiver unit is further configured to send the first downlink control information to the terminal device.

Embodiment 74: In the network device according to Embodiment 69, when the category of the indication information included in the downlink control information includes neither the first indication information nor the second indication information, the transceiver unit is further configured to: not send the first downlink control information to the terminal device.

Embodiment 75: In the network device according to any one of Embodiment 69 to Embodiment 74, a sending moment of the first downlink control information is before a start moment of the on duration on duration in the first DRX cycle.

Embodiment 76: A terminal device includes: a transceiver, configured to send and receive data; and a processor, configured to enable the terminal device to perform the method according to any one of Embodiment 48 to Embodiment 54.

Embodiment 77: A network device includes: a transceiver, configured to send and receive data; and a processor, configured to enable the network device to perform the method according to any one of Embodiment 55 to Embodiment 61.

Embodiment 78: A communications system includes a network device and a terminal device.

The terminal device is configured to receive first configuration information from the network device, where the first configuration information is used to configure or indicate the terminal device to receive downlink control information.

A category of indication information included in the downlink control information includes at least one of first indication information or second indication information, or a category of indication information included in the downlink control information includes neither first indication information nor second indication information.

The first indication information is used to indicate the terminal device whether to start an on duration on duration timer in a first discontinuous reception DRX cycle, and the second indication information is used to indicate the terminal device whether to perform a dormancy operation in a secondary cell.

The terminal device is further configured to monitor or not monitor first downlink control information based on the first configuration information and the category of the indication information included in the downlink control information.

The network device is further configured to send or not send the first downlink control information based on the first configuration information and the category of the indication information included in the downlink control information.

Embodiment 79: In the communications system according to Embodiment 78, when the category of the indication information included in the downlink control information includes the first indication information, the terminal device is further configured to: receive second configuration information from the network device, where the second configuration information is used to configure that the category of the indication information included in the downlink control information includes the first indication information; or the category of the indication information included in the downlink control information includes the first indication information by default.

Embodiment 80: In the communications system according to Embodiment 78 or Embodiment 79, the terminal device is further configured to: monitor the first downlink control information; and when the first indication information is used to indicate the terminal device to start the on duration timer in the first DRX cycle, start the on duration timer in the first DRX cycle, and monitor a PDCCH in each cell within on duration in the first DRX cycle; or when the first indication information is used to indicate the terminal device not to start the on duration timer in the first DRX cycle, not start the on duration timer in the first DRX cycle, and not monitor a PDCCH in each cell within on duration in the first DRX cycle.

Embodiment 81: In the communications system according to any one of Embodiment 78 to Embodiment 80, the network device is further configured to: send the first downlink control information to the terminal device; and when the first indication information is used to indicate the terminal device to start the on duration timer in the first DRX cycle, send a PDCCH to the terminal device in each cell within the on duration in the first DRX cycle; or when the first indication information is used to indicate the terminal device not to start the on duration timer in the first DRX cycle, not send a PDCCH to the terminal device in each cell within the on duration in the first DRX cycle.

Embodiment 82: In the communications system according to Embodiment 78, when the category of the indication information included in the downlink control information includes the first indication information and the second indication information, the terminal device is further configured to: monitor the first downlink control information; and when the first indication information is used to indicate the terminal device to start the on duration timer in the first DRX cycle, start the on duration timer in the first DRX cycle, monitor a physical downlink control channel PDCCH in a primary cell within on duration in the first DRX cycle, and determine, based on the second indication information, whether to monitor a PDCCH in the secondary cell within the on duration in the first DRX cycle; or when the first indication information is used to indicate the terminal device not to start the on duration timer in the first DRX cycle, not start the on duration timer in the first DRX cycle, and not monitor a PDCCH in each cell within on duration in the first DRX cycle.

Embodiment 83: In the communications system according to Embodiment 78 or Embodiment 82, when the category of the indication information included in the downlink control information includes the first indication information and the second indication information, the network device is further configured to: when the first indication information is used to indicate the terminal device to start the on duration timer in the first DRX cycle, send a PDCCH to the terminal device in the primary cell within the on duration in the first DRX cycle, and determine the second indication information based on whether the network device sends a PDCCH to the terminal device in the secondary cell within the on duration in the first DRX cycle; or when the first indication information is used to indicate the terminal device not to start the on duration timer in the first DRX cycle, not send a PDCCH in each cell within the on duration in the first DRX cycle; and send the first downlink control information to the terminal device.

Embodiment 84: In the communications system according to Embodiment 78, when the category of the indication information included in the downlink control information includes the second indication information, the terminal device is further configured to: monitor the first downlink control information; start the on duration timer in the first DRX cycle, and monitor a PDCCH in a primary cell within on duration in the first DRX cycle; and determine, based on the second indication information, whether to monitor a PDCCH in the secondary cell within the on duration in the first DRX cycle.

Embodiment 85: In the communications system according to Embodiment 78 or Embodiment 84, when the category of the indication information included in the downlink control information includes the second indication information, the network device is further configured to: send a PDCCH to the terminal device in the primary cell within the on duration in the first DRX cycle; determine the second indication information based on whether the network device sends a PDCCH to the terminal device in the secondary cell within the on duration in the first DRX cycle; and send the first downlink control information to the terminal device.

Embodiment 86: In the communications system according to Embodiment 78, when the category of the indication information included in the downlink control information includes neither the first indication information nor the second indication information, the terminal device is further configured to: not monitor the first downlink control information.

Embodiment 87: In the communications system according to Embodiment 78 or Embodiment 86, when the category of the indication information included in the downlink control information includes neither the first indication information nor the second indication information, the network device is further configured to: not send the first downlink control information to the terminal device.

Embodiment 88: In the communications system according to any one of Embodiment 78 to Embodiment 87, a sending moment of the first downlink control information is before a start moment of the on duration on duration in the first DRX cycle.

Embodiment 89: A chip is provided, where the chip is coupled to a memory, and is configured to read and execute program instructions stored in the memory, to implement the method according to any one of Embodiments 1 to 16 or Embodiments 48 to 61.

Embodiment 90: A computer-readable storage medium is provided, where the computer-readable storage medium stores computer executable instructions, and when being invoked by a computer, the computer executable instructions are used to enable the computer to perform the method according to any one of Embodiments 1 to 16 or Embodiments 48 to 61.

Embodiment 91: A computer program product including instructions is provided, where when the computer program product runs on a computer, the computer is enabled to perform the method according to any one of Embodiments 1 to 16 or Embodiments 48 to 61.

A person skilled in the art should understand that the embodiments of this disclosure may be provided as a method, a system, or a computer program product. Therefore, this disclosure may use a form of hardware only embodiments, software only embodiments, or embodiments with a combination of software and hardware. Moreover, this disclosure may use a form of a computer program product that is implemented on one or more computer-usable storage media (including but not limited to a disk memory, a compact disc read-only memory (CD-ROM), an optical memory, and the like) that include computer-usable program code.

This disclosure is described with reference to the flowcharts and/or block diagrams of the method, the device (system), and the computer program product according to the embodiments of this disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the other programmable data processing device generate an apparatus for implementing a specific function in one or more processes in the flowcharts and/or in one or more blocks in the block diagrams.

These computer program instructions may be alternatively stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be alternatively loaded onto a computer or another programmable data processing device, so that a series of operations and steps are performed on the computer or the other programmable device, to generate computer-implemented processing. Therefore, the instructions executed on the computer or the other programmable device provide steps for implementing a specific function in one or more processes in the flowcharts and/or in one or more blocks in the block diagrams.

It is clear that, a person skilled in the art can make various modifications and variations to the embodiments of this disclosure without departing from the scope of the embodiments of this disclosure. This disclosure is intended to cover these modifications and variations of the embodiments of this disclosure provided that they fall within the scope of protection defined by the following claims and their equivalent technologies.

What is claimed is:

1. A communication method implemented by a terminal device or a chip in the terminal device, the communication method comprising:
receiving indication information;
determining, based on the indication information, not to
  perform dormancy behavior in a target secondary cell;

determining whether a bandwidth part (BWP) on which the terminal device currently works in the target secondary cell is dormant BWP or non-dormant BWP;
keeping, in the target secondary cell, working on the BWP on which the terminal device currently works when the BWP on which the terminal device currently works in the target secondary cell is non-dormant BWP; and
switching to a first BWP in the target secondary cell and working on the first BWP when the BWP on which the terminal device currently works in the target secondary cell is dormant BWP,
wherein the first BWP is non-dormant BWP in the target secondary cell.

2. The communication method of claim 1, wherein the first BWP is a BWP used by the terminal device when the terminal device switches from dormant BWP, and wherein the first BWP is a default non-dormant BWP configured by a network device.

3. The communication method of claim 1, wherein receiving the indication information from the network device comprises receiving downlink control information (DCI) from a network device, and wherein the DCI comprises the indication information.

4. The communication method of claim 3, wherein a format of the DCI comprises a DCI format 2_6, a DCI format 0_1, or a DCI format 1_1.

5. The communication method of claim 4, wherein connected mode discontinuous reception (C-DRX) is not configured for the terminal device, or wherein C-DRX is configured for the terminal device, a sending moment of the DCI is within an active time, and the format of the DCI comprises the DCI format 0_1 or the DCI format 1_1.

6. The communication method of claim 4, wherein connected mode discontinuous reception (C-DRX) is configured for the terminal device, wherein a sending moment of the DCI is before an on duration, and wherein the format of the DCI comprises the DCI format 2_6.

7. The communication method of claim 1, wherein a size of the indication information is 1 bit.

8. The communication method of claim 1, the indication information is sent in a primary cell.

9. The communication method of claim 1, wherein the communication method further comprises switching to the dormant BWP and working on the dormant BWP when the terminal device determines to perform the dormancy behavior in the target secondary cell.

10. A communication method implemented by a network device or a chip in the network device, wherein the communication method comprises:
generating indication information;
sending the indication information to prompt a terminal device to determine, based on the indication information, not to perform dormancy behavior in a target secondary cell;
determining whether a bandwidth part (BWP) on which the terminal device currently works in the target secondary cell is dormant BWP or non-dormant BWP;
determining that the terminal device keeps working in the target secondary cell on the BWP on which the terminal device currently works when the BWP on which the terminal device currently works in the target secondary cell is non-dormant BWP; and
determining that the terminal device switches to a first BWP in the target secondary cell and works on the first BWP when the BWP on which the terminal device currently works in the target secondary cell is dormant BWP,
wherein the first BWP is non-dormant BWP in the target secondary cell.

11. A terminal device or a chip in the terminal device, comprising:
a transceiver configured to receive indication information from a network device; and
a processor coupled to the transceiver and configured to:
determine, based on the indication information, not to perform dormancy behavior in a target secondary cell;
determine whether a bandwidth part (BWP) on which the terminal device currently works in the target secondary cell is dormant BWP or non-dormant BWP;
keep, in the target secondary cell, working on the BWP on which the terminal device currently works when the BWP on which the terminal device currently works in the target secondary cell is non-dormant BWP; and
switch to a first BWP in the target secondary cell and work on the first BWP when the BWP on which the terminal device currently works in the target secondary cell is dormant BWP,
wherein the first BWP is non-dormant BWP in the target secondary cell.

12. The terminal device or the chip in the terminal device of claim 11, wherein the first BWP is a BWP used by the terminal device when the terminal device switches from dormant BWP, and wherein the first BWP is a default non-dormant BWP configured by the network device.

13. The terminal device or the chip in the terminal device of claim 11, wherein when receiving the indication information from the network device, the transceiver is further configured to receive downlink control information (DCI) from the network device, and wherein the DCI comprises the indication information.

14. The terminal device or the chip in the terminal device of claim 13, wherein a format of the DCI comprises a DCI format 2_6, a DCI format 0_1, or a DCI format 1_1.

15. The terminal device or the chip in the terminal device of claim 14, wherein connected mode discontinuous reception (C-DRX) is not configured for the terminal device, or C-DRX is configured for the terminal device and a sending moment of the DCI is within an active time, and wherein the format of the DCI comprises the DCI format 0_1 or the DCI format 1_1.

16. The terminal device or the chip in the terminal device of claim 14, wherein connected mode discontinuous reception (C-DRX) is configured for the terminal device and a sending moment of the DCI is before on duration, and wherein the format of the DCI comprises the DCI format 2_6.

17. The terminal device or the chip in the terminal device of claim 11, wherein a size of the indication information is 1 bit.

18. The terminal device or the chip in the terminal device of claim 11, wherein the indication information is sent in a primary cell.

19. The terminal device or the chip in the terminal device of claim 11, wherein the processor is further configured to switch to the dormant BWP and work on the dormant BWP when the processor determines to perform the dormancy behavior in the target secondary cell.

20. A network device or a chip in the network device, comprising:
a transceiver configured to send indication information to prompt a terminal device to determine, based on the indication information, not to perform dormancy behavior in a target secondary cell; and a processor coupled to the transceiver and configured to:
- determine whether a bandwidth part (BWP) on which the terminal device currently works in the target secondary cell is dormant BWP or non-dormant BWP;
- determine that the terminal device keeps, in the target secondary cell, working on the BWP on which the terminal device currently works when the BWP on which the terminal device currently works in the target secondary cell is non-dormant BWP; and
- determine that the terminal device switches to a first BWP in the target secondary cell and works on the first BWP when the BWP on which the terminal device currently works in the target secondary cell is dormant BWP, wherein the first BWP is non-dormant BWP in the target secondary cell.

* * * * *

UNITED STATES PATENT AND TRADEMARK OFFICE
CERTIFICATE OF CORRECTION

| | | |
|---|---|---|
| PATENT NO. | : 12,335,931 B2 | Page 1 of 1 |
| APPLICATION NO. | : 17/738753 | |
| DATED | : June 17, 2025 | |
| INVENTOR(S) | : Yifan Xue et al. | |

It is certified that error appears in the above-identified patent and that said Letters Patent is hereby corrected as shown below:

In the Claims

Claim 3, Column 35, Lines 20-21: "information from the network device comprises" should read "information comprises"

Signed and Sealed this
Twenty-second Day of July, 2025

Coke Morgan Stewart
*Acting Director of the United States Patent and Trademark Office*